US010755753B2

(12) United States Patent
Kang et al.

(10) Patent No.: US 10,755,753 B2
(45) Date of Patent: Aug. 25, 2020

(54) MEMORY DEVICE WITH FLEXIBLE INTERNAL DATA WRITE CONTROL CIRCUITRY

(71) Applicant: Intel Corporation, Santa Clara, CA (US)

(72) Inventors: Uksong Kang, Hillsboro, OR (US); Christopher E. Cox, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/277,797

(22) Filed: Feb. 15, 2019

(65) Prior Publication Data

US 2019/0252009 A1   Aug. 15, 2019

Related U.S. Application Data

(63) Continuation of application No. 15/804,920, filed on Nov. 6, 2017, now Pat. No. 10,249,351.

(Continued)

(51) Int. Cl.
| | |
|---|---|
| *G11C 7/10* | (2006.01) |
| *G11C 11/406* | (2006.01) |
| *G11C 11/408* | (2006.01) |
| *G11C 7/22* | (2006.01) |
| *H04L 29/06* | (2006.01) |
| *G11C 16/10* | (2006.01) |

(Continued)

(52) U.S. Cl.
CPC .................. *G11C 7/10* (2013.01); *G11C 7/22* (2013.01); *G11C 11/408* (2013.01); *G11C 11/4093* (2013.01); *G11C 11/4096* (2013.01); *G11C 11/40607* (2013.01); *G11C 16/10* (2013.01); *H04L 29/06* (2013.01); *G06K 9/00006* (2013.01); *G11C 2207/229* (2013.01)

(58) Field of Classification Search
CPC .. G11C 16/10; G11C 7/10; G11C 7/22; G11C 11/408; G11C 11/40607; G11C 2207/229; G06K 9/00006
See application file for complete search history.

(56) References Cited

U.S. PATENT DOCUMENTS

| | | | |
|---|---|---|---|
| 5,381,368 | A | 1/1995 | Morgan et al. |
| 5,440,517 | A | 8/1995 | Morgan et al. |

(Continued)

FOREIGN PATENT DOCUMENTS

WO    2015148870 A1   10/2015

OTHER PUBLICATIONS

Office Action for U.S. Appl. No. 15/804,920, dated Apr. 6, 2018, 16 pages.

*Primary Examiner* — Ajay Ojha
(74) *Attorney, Agent, or Firm* — Compass IP Law PC

(57) ABSTRACT

A memory subsystem is enabled with a write pattern command. The write pattern command can have a different command encoding from other write commands. The write pattern command triggers a dynamic random access memory (DRAM) device to write a data pattern that is internally generated, instead of a bit pattern on the data signal lines of the data bus. The internally generated data pattern can be read from a register, such as a mode register. In response to a write pattern command, the DRAM device provides the write pattern data from the register to the memory array to write. Thus, the memory controller does not need to send the data to the memory device.

27 Claims, 14 Drawing Sheets

Related U.S. Application Data

(60) Provisional application No. 62/418,184, filed on Nov. 6, 2016.

(51) Int. Cl.
*G11C 11/4093* (2006.01)
*G11C 11/4096* (2006.01)
*G06K 9/00* (2006.01)

(56) References Cited

U.S. PATENT DOCUMENTS

| | | | |
|---|---|---|---|
| 5,625,601 A | 4/1997 | Gillingham et al. |
| 5,854,771 A | 12/1998 | Mori |
| 5,886,944 A | 3/1999 | Ahn |
| 5,956,285 A | 9/1999 | Watanabe et al. |
| 6,130,852 A | 10/2000 | Ohtani et al. |
| 6,246,614 B1 | 6/2001 | Ooishi |
| 6,289,413 B1 | 9/2001 | Rogers et al. |
| 6,337,832 B1 | 1/2002 | Ooishi et al. |
| 6,449,204 B1 | 9/2002 | Arimoto et al. |
| 6,862,704 B1 | 3/2005 | Miner |
| 6,973,541 B1 | 12/2005 | Williams et al. |
| 9,001,607 B2 | 4/2015 | Ong |
| 9,922,695 B2 | 3/2018 | Tomishima et al. |
| 9,990,141 B1 | 6/2018 | Maeda et al. |
| 2001/0008498 A1 | 7/2001 | Ooishi |
| 2001/0040830 A1 | 11/2001 | Matsui et al. |
| 2002/0118882 A1 | 8/2002 | Tezuka |
| 2005/0251713 A1 | 11/2005 | Lee |
| 2006/0233013 A1 | 10/2006 | Tu et al. |
| 2007/0011596 A1 | 1/2007 | Suh |
| 2007/0147160 A1 | 6/2007 | Hanzawa et al. |
| 2008/0192556 A1 | 8/2008 | Kim et al. |
| 2010/0037122 A1 | 2/2010 | Blackmon et al. |
| 2010/0091538 A1 | 4/2010 | Kim et al. |
| 2010/0106916 A1 | 4/2010 | Gunna et al. |
| 2010/0149894 A1 | 6/2010 | Mochida et al. |
| 2010/0157693 A1 | 6/2010 | Iwai et al. |
| 2011/0007583 A1 | 1/2011 | Lee et al. |
| 2011/0013447 A1 | 1/2011 | Hanzawa et al. |
| 2011/0289270 A1 | 11/2011 | Bell, Jr. et al. |
| 2012/0159077 A1 | 6/2012 | Steely et al. |
| 2013/0151776 A1 | 6/2013 | Edelhaeuser et al. |
| 2014/0032830 A1 | 1/2014 | Hampel et al. |
| 2014/0059285 A1 | 2/2014 | Kim et al. |
| 2014/0063977 A1 | 3/2014 | Park |
| 2014/0173234 A1 | 6/2014 | Jung et al. |
| 2014/0177347 A1 | 6/2014 | Chatterjee et al. |
| 2014/0325157 A1 | 10/2014 | Sangapu et al. |
| 2015/0012694 A1 | 1/2015 | Edelhaeuser |
| 2015/0134871 A1 | 5/2015 | Benisty et al. |
| 2015/0187440 A1 | 7/2015 | Hollis |
| 2015/0286406 A1 | 10/2015 | Maghraoui et al. |
| 2015/0286408 A1 | 10/2015 | Hampel et al. |
| 2016/0284390 A1 | 9/2016 | Tomishima et al. |
| 2018/0033489 A1 | 2/2018 | Son et al. |
| 2018/0095687 A1 | 4/2018 | Bedeschi et al. |
| 2018/0181344 A1 | 6/2018 | Tomishima et al. |

MODE REGISTER 300

| MR ADDR | WRITE PATTERN | OP7 | OP6 | OP5 | OP4 | OP3 | OP2 | OP1 | OP0 |
|---|---|---|---|---|---|---|---|---|---|
| MRx Ay | UI | D7 | D6 | D5 | D4 | D3 | D2 | D1 | D0 |

| UI | U0 | U1 | U2 | U3 | U4 | U5 | U6 | U7 | U8 | U9 | U10 | U11 | U12 | U13 | U14 | UI15 |
|---|---|---|---|---|---|---|---|---|---|---|---|---|---|---|---|---|
| DQ0 | OP0 ||||||||||||||||
| DQ1 | OP1 ||||||||||||||||
| DQ2 | OP2 ||||||||||||||||
| DQ3 | OP3 ||||||||||||||||
| DQ4 | OP4 ||||||||||||||||
| DQ5 | OP5 ||||||||||||||||
| DQ6 | OP6 ||||||||||||||||
| DQ7 | OP7 ||||||||||||||||
| DQ8 | OP0 ||||||||||||||||
| DQ9 | OP1 ||||||||||||||||
| DQ10 | OP2 ||||||||||||||||
| DQ11 | OP3 ||||||||||||||||
| DQ12 | OP4 ||||||||||||||||
| DQ13 | OP5 ||||||||||||||||
| DQ14 | OP6 ||||||||||||||||
| DQ15 | OP7 |||||||||||||||| x4 (DQ0–DQ3), x8 (DQ0–DQ7), x16 (DQ0–DQ15)

| FUNCTION | ABBR | CS | CA0 | CA1 | CA2 | CA3 | CA4 | CA5 | CA6 | CA7 | CA8 | CA9 | CA10 | CA11 | CA12 | CA13 |
|---|---|---|---|---|---|---|---|---|---|---|---|---|---|---|---|---|
| ACTIVATE | ACT | L | L | L | R0 | R1 | R2 | R3 | BA0 | BA1 | BG0 | BG1 | BG2 | CID0 | CID1 | CID2 |
| | | H | R4 | R5 | R6 | R7 | R8 | R9 | R10 | R11 | R12 | R13 | R14 | R15 | R16 | CID3/R17 |
| RESERVED | RFU | L | H | L | L | L | L | V | V | V | V | V | V | V | V | V |
| | | H | V | V | V | V | V | V | V | V | V | V | V | V | V | V |
| RESERVED | RFU | L | H | L | L | L | H | V | V | V | V | V | V | V | V | V |
| | | H | V | V | V | V | V | V | V | V | V | V | V | V | V | V |
| WRITE PATTERN | WRP | L | H | L | L | H | L | V | BA0 | BA1 | BG0 | BG1 | BG2 | CID0 | CID1 | CID2 |
| | | H | V | C3 | C4 | C5 | V | C6 | C7 | C8 | C9 | C10 | AP=L | V | V | CID3 |
| MODE REGISTER WRITE | MRW | L | H | L | H | L | L | MRA0 | MRA1 | MRA2 | MRA3 | MRA4 | MRA5 | MRA6 | MRA7 | V |
| | | H | OP0 | OP1 | OP2 | OP3 | OP4 | OP5 | OP6 | OP7 | V | V | CW | V | V | V |
| MODE REGISTER READ | MRR | L | H | L | H | L | H | MRA0 | MRA1 | MRA2 | MRA3 | MRA4 | MRA5 | MRA6 | MRA7 | V |
| | | H | V | V | V | V | V | V | V | V | V | V | CW | V | V | V |
| WRITE | WR | L | H | L | H | H | L | V | BA0 | BA1 | BG0 | BG1 | BG2 | CID0 | CID1 | CID2 |
| | | H | V | C3 | C4 | C5 | BC8=L | C6 | C7 | C8 | C9 | C10 | AP=L | WR PARTIAL=L | V | CID3 |
| READ | RD | L | H | L | H | H | H | V | BA0 | BA1 | BG0 | BG1 | BG2 | CID0 | CID1 | CID2 |
| | | H | C2 | C3 | C4 | C5 | BC8=L | C6 | C7 | C8 | C9 | C10 | AP=L | V | V | CID3 |
| VREF CA CMD | VrefCA | L | H | H | L | L | L | OP0 | OP1 | OP2 | OP3 | OP4 | OP5 | OP6 | OP7 | V |
| REFRESH ALL | REF | L | H | H | L | L | H | CID3 | V | V | V | V | L | CID0 | CID1 | CID2 |
| REFRESH SAME BANK | REFsb | L | H | H | L | H | H | CID3 | BA0 | BA1 | V | V | H | CID0 | CID1 | CID2 |
| PRECHARGE ALL | PREA | L | H | H | L | H | L | CID3 | V | V | V | V | L | CID0 | CID1 | CID2 |
| PRECHARGE SAME BANK | PREsb | L | H | H | L | L | L | CID3 | BA0 | BA1 | V | V | H | CID0 | CID1 | CID2 |
| PRECHARGE | PRE | L | H | H | L | H | H | CID3 | BA0 | BA1 | BG0 | BG1 | BG2 | CID0 | CID1 | CID2 |
| RESERVED | RFU | L | H | H | H | L | L | V | V | V | V | V | V | V | V | V |
| SELF REFRESH ENTRY | SRE | L | H | H | H | L | H | V | V | V | V | V | L | V | V | V |
| POWER DOWN ENTRY | PDE | L | H | H | H | L | H | V | V | V | V | V | H | ODT=L | V | V |
| MULTIPURPOSE CMD | MPC | L | H | H | H | H | L | OP0 | OP1 | OP2 | OP3 | OP4 | OP5 | OP6 | OP7 | V |
| NO OPERATION | NOP | L | H | H | H | H | H | V | V | V | V | V | V | V | V | V |
| POWER DOWN EXIT | PDE | L | H | H | H | H | H | V | V | V | V | V | V | V | V | V |
| DESELECT | DES | H | X | X | X | X | X | X | X | X | X | X | X | X | X | X |

FIG. 13

MEMORY DEVICE WITH FLEXIBLE INTERNAL DATA WRITE CONTROL CIRCUITRY

PRIORITY

The present application is a continuation of and claims the benefit of U.S. Nonprovisional patent application Ser. No. 15/804,920 filed Nov. 6, 2017, which in turn claims the benefit of U.S. Provisional Patent Application No. 62/418,184, filed Nov. 6, 2016; which are incorporated herein by reference in their entirety.

FIELD

Descriptions are generally related to computer memory systems, and more particular descriptions are related to write data circuitry for memory devices.

BACKGROUND

With the increase in the amount of data that computing systems generate, collect, and process, there has been an increasing demand for data throughput between computer processors that execute the operations of the computing devices and the memory which stores the data for execution. The interface between the processor and the memory devices can become a bottleneck in the overall performance of the computing device. One approach to reduce the bottleneck between the processor and the memory devices is to replace part or all of the data with a predefined data pattern inside the memory when writing data into the memory array. For example, for a frequently occurring data pattern such as all-zeros or all-ones, instead of sending the actual data over the data channel from the controller to the memory, a new signal can be created to generate and replace this frequently occurring data pattern inside the memory. Replacement of the data reduces the transfer of data on the data bus, which can improve I/O (input/output) power and data bus utilization efficiency. However, additional signal lines increases the required hardware and pinout, which is not desired, and inefficient circuits and data write operations at the memory device can reduce the efficiency gains that data pattern replacement or substitution could provide.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 3 is a representation of an embodiment of write pattern configuration settings.

FIG. 4 is a representation of an embodiment of a data output mapping for a burst length of 16.

FIG. 13 is a representation of an embodiment of a command truth table compatible with a write pattern command.

Figure 1:
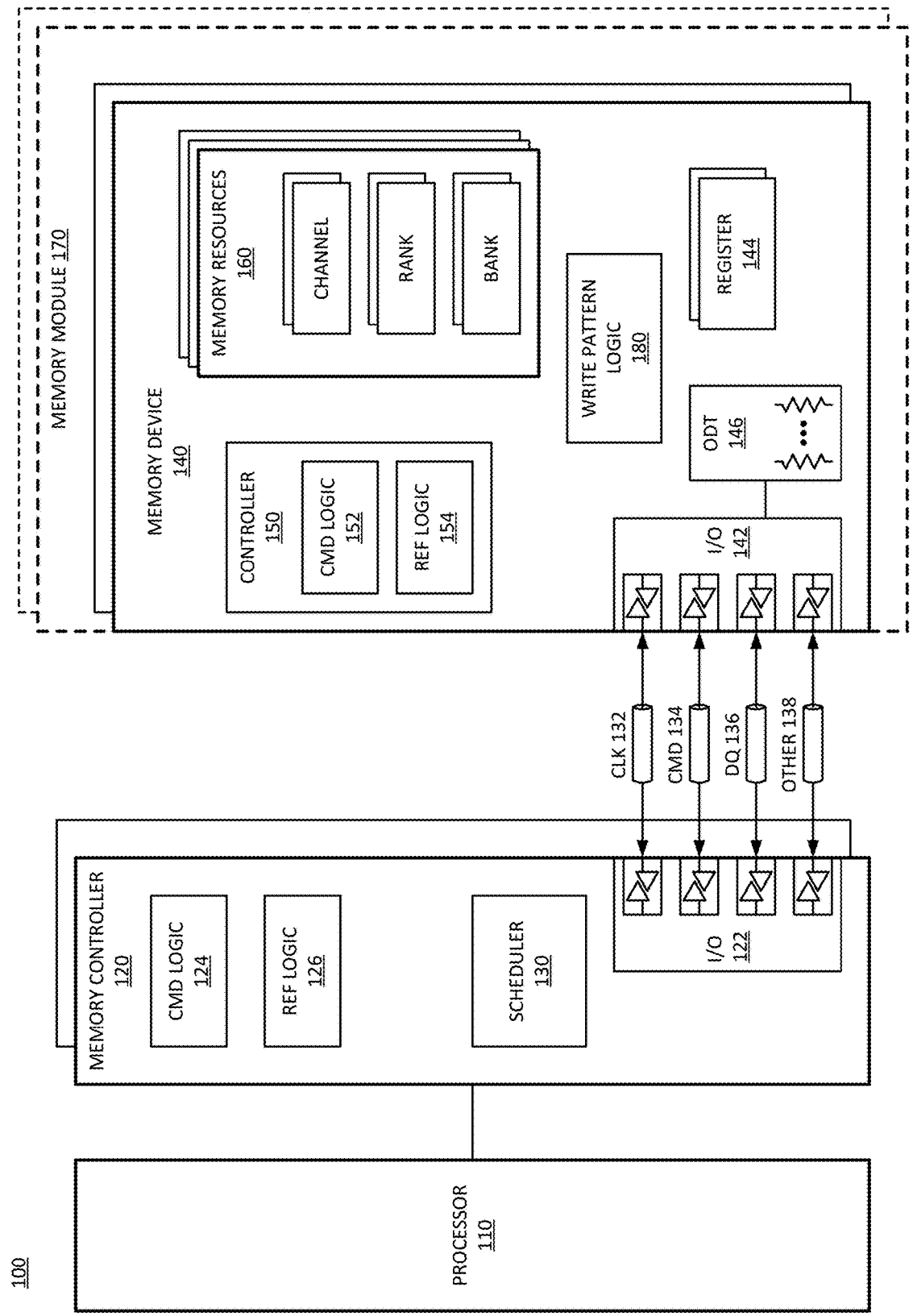
FIG. 1 is a block diagram of an embodiment of a memory subsystem in which write data pattern replacement can be implemented.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, an efficient circuit and data pattern replacement is described to generate a predefined data pattern inside a memory during writes. A new mode can be provided for memory devices to address the significant percentage of writes that contain a data pattern, such all zeros or other data pattern. In one embodiment, a memory subsystem is enabled with a write pattern command. The write pattern command can have a different command encoding from other write commands. The write pattern command triggers a dynamic random access memory (DRAM) device to write an internally generated data pattern instead of a bit pattern on the data signal lines of the data bus. In one embodiment, the internally generated data pattern is generated based on accessing write pattern data from a register, such as a mode register. In response to a write pattern command, the DRAM device provides the write pattern data from the register to the memory array to write. Thus, the memory controller does not need to send the data to the memory device.

In one embodiment, such a new mode can be applied to a DDR5 (double data rate version 5) memory device as a new Write Pattern command (WRP). When used effectively, the command can save power by not actually sending the data across the bus. There are many instances where some or all data on a data bus is a known data pattern, or where a data pattern is repeatedly written over a period of writes, and the data can be replaced by transfer of a command to identify the data without having to send the actual data on the data bus. In response to the command, the memory device can replace the data signal line input with an internally generated data pattern. In one embodiment, the data pattern is read from a register such as a mode register. In one embodiment, the data pattern is generated on the input to the memory array through an input register or other input circuitry.

The new mode or new command can be operated very similarly to a standard write command except that instead of the memory device reading data from the data bus, the write command can indicate a write data pattern, such as by encoding the data in the command. In one embodiment, a WRP command does not encode data in the command, but triggers the memory device to read the data without sending data on the DQ (data) bus. In one embodiment, the WRP command can trigger the memory system for no toggling of DQS (data strobe or timing signal). In one embodiment, in response to a WRP command, a DRAM device does not turn on internal ODT (on-die termination). In one embodiment, ECC (error checking and correction) code for a pattern of all zeros can be assumed to be zero for the WRP.

The write data paths of a memory device generally include a data input buffer, data-latching flip-flop, de-serializer, and data alignment flip-flop. It will be understood that other circuitry can be included with this write data path circuitry. While the write data propagates through these stages of input circuitry, data is converted from a serial input to parallel output, which is often referred to as de-serialization. For example, in a DDR5 DRAM a burst of serial 16 bits is converted to parallel 16 bits for each DQ. In one embodiment, registers or flip-flops can be changed to either set or reset their data values, in addition to having normal input and output. By providing means to set or reset data alignment flip-flops individually or in a group selectively, the predefined data patterns can be programmed efficiently. For data to come from the DQ I/O (input/output) bits, or the data bits of the data signal lines, the registers can simply align the input data sample from the signal lines. Such data can then be output. For a write pattern mode, each individual register can be set or reset to force a one or a zero on the output of the register. Thus, a small change to traditional data input buffer circuits to enable set or reset of the data in a data alignment register, and including additional control logic to control the setting or resetting, can enable efficient write pattern operation.

FIG. 1 is a block diagram of an embodiment of a memory subsystem in which write data pattern replacement can be implemented. System 100 includes a processor and elements of a memory subsystem in a computing device. Processor 110 represents a processing unit of a computing platform that may execute an operating system (OS) and applications, which can collectively be referred to as the host or the user of the memory. The OS and applications execute operations that result in memory accesses. Processor 110 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 100 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, JESD79, initial specification published in September 2012 by JEDEC), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, currently in discussion by JEDEC), LPDDR5 (currently in discussion by JEDEC), HBM2 ((HBM version 2), currently in discussion by JEDEC), or others or combinations of memory technologies, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation nonvolatile devices, such as a three dimensional crosspoint memory device, other byte addressable nonvolatile memory devices, or memory devices that use chalcogenide phase change material (e.g., chalcogenide glass). In one embodiment, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

Memory controller 120 represents one or more memory controller circuits or devices for system 100. Memory controller 120 represents control logic that generates memory access commands in response to the execution of operations by processor 110. Memory controller 120 accesses one or more memory devices 140. Memory devices 140 can be DRAM devices in accordance with any referred to above. In one embodiment, memory devices 140 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one embodiment, settings for each channel are controlled by separate mode registers or other register settings. In one embodiment, each memory controller 120 manages a separate memory channel, although system 100 can be configured to have multiple channels managed by a single controller, or to have multiple controllers on a single channel. In one embodiment, memory controller 120 is part of host processor 110, such as logic implemented on the same die or implemented in the same package space as the processor.

Memory controller 120 includes I/O interface logic 122 to couple to a memory bus, such as a memory channel as referred to above. I/O interface logic 122 (as well as I/O interface logic 142 of memory device 140) can include pins, pads, connectors, signal lines, traces, or wires, or other hardware to connect the devices, or a combination of these. I/O interface logic 122 can include a hardware interface. As illustrated, I/O interface logic 122 includes at least drivers/transceivers for signal lines. Commonly, wires within an integrated circuit interface couple with a pad, pin, or connector to interface signal lines or traces or other wires between devices. I/O interface logic 122 can include drivers, receivers, transceivers, or termination, or other circuitry or combinations of circuitry to exchange signals on the signal lines between the devices. The exchange of signals includes at least one of transmit or receive. While shown as coupling I/O 122 from memory controller 120 to I/O 142 of memory device 140, it will be understood that in an implementation of system 100 where groups of memory devices 140 are accessed in parallel, multiple memory devices can include I/O interfaces to the same interface of memory controller 120. In an implementation of system 100 including one or more memory modules 170, I/O 142 can include interface hardware of the memory module in addition to interface hardware on the memory device itself. Other memory controllers 120 will include separate interfaces to other memory devices 140.

The bus between memory controller 120 and memory devices 140 can be implemented as multiple signal lines coupling memory controller 120 to memory devices 140. The bus may typically include at least clock (CLK) 132, command/address (CMD) 134, and write data (DQ) and read data (DQ) 136, and zero or more other signal lines 138. In one embodiment, a bus or connection between memory controller 120 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one embodiment, independent channels have different clock signals, C/A buses, data buses, and other signal lines. Thus, system 100 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 120 and memory devices 140. An example of a serial bus technology is 86106 encoding and transmission of high-speed data with embedded clock over a single differential pair of signals in each direction. In one embodiment, CMD 134 represents signal lines shared in parallel with multiple memory devices. In one embodiment, multiple memory devices share encoding command signal lines of CMD 134, and each has a separate chip select (CS_n) signal line to select individual memory devices.

It will be understood that in the example of system 100, the bus between memory controller 120 and memory devices 140 includes a subsidiary command bus CMD 134 and a subsidiary bus to carry the write and read data, DQ 136. In one embodiment, the data bus can include bidirectional lines for read data and for write/command data. In another embodiment, the subsidiary bus DQ 136 can include unidirectional write signal lines for write and data from the host to memory, and can include unidirectional lines for read data from the memory to the host. In accordance with the chosen memory technology and system design, other signals 138 may accompany a bus or sub bus, such as strobe lines DQS. Based on design of system 100, or implementation if a design supports multiple implementations, the data bus can have more or less bandwidth per memory device 140. For example, the data bus can support memory devices that have either a x32 interface, a x16 interface, a x8 interface, or other interface. The convention "xW," where W is an integer that refers to an interface size or width of the interface of memory device 140, which represents a number of signal lines to exchange data with memory controller 120. The interface size of the memory devices is a controlling factor on how many memory devices can be used concurrently per channel in system 100 or coupled in parallel to the same signal lines. In one embodiment, high bandwidth memory devices, wide interface devices, or stacked memory configurations, or combinations, can enable wider interfaces, such as a x128 interface, a x256 interface, a x512 interface, a x1024 interface, or other data bus interface width.

In one embodiment, memory devices 140 and memory controller 120 exchange data over the data bus in a burst, or a sequence of consecutive data transfers. The burst corresponds to a number of transfer cycles, which is related to a bus frequency. In one embodiment, the transfer cycle can be a whole clock cycle for transfers occurring on a same clock or strobe signal edge (e.g., on the rising edge). In one embodiment, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device 140 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 140 represent memory resources for system 100. In one embodiment, each memory device 140 is a separate memory die. In one embodiment, each memory device 140 can interface with multiple (e.g., 2) channels per device or die. Each memory device 140 includes I/O interface logic 142, which has a bandwidth determined by the implementation of the device (e.g., x16 or x8 or some other interface bandwidth). I/O interface logic 142 enables the memory devices to interface with memory controller 120. I/O interface logic 142 can include a hardware interface, and can be in accordance with I/O 122 of memory controller, but at the memory device end. In one embodiment, multiple memory devices 140 are connected in parallel to the same command and data buses. In another embodiment, multiple memory devices 140 are connected in parallel to the same command bus, and are connected to different data buses. For example, system 100 can be configured with multiple memory devices 140 coupled in parallel, with each memory device responding to a command, and accessing memory resources 160 internal to each. For a Write operation, an individual memory device 140 can write a portion of the overall data word, and for a Read operation, an individual memory device 140 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word will be provided or received by other memory devices in parallel.

In one embodiment, memory devices 140 are disposed directly on a motherboard or host system platform (e.g., a PCB (printed circuit board) on which processor 110 is disposed) of a computing device. In one embodiment, memory devices 140 can be organized into memory modules 170. In one embodiment, memory modules 170 represent dual inline memory modules (DIMMs). In one embodiment, memory modules 170 represent other organization of multiple memory devices to share at least a portion of access or control circuitry, which can be a separate circuit, a separate device, or a separate board from the host system platform. Memory modules 170 can include multiple memory devices 140, and the memory modules can include support for multiple separate channels to the included memory devices disposed on them. In another embodiment, memory devices 140 may be incorporated into the same package as memory controller 120, such as by techniques such as multi-chip-module (MCM), package-on-package, through-silicon via (TSV), or other techniques or combinations. Similarly, in one embodiment, multiple memory devices 140 may be incorporated into memory modules 170, which themselves may be incorporated into the same package as memory controller 120. It will be appreciated that for these and other embodiments, memory controller 120 may be part of host processor 110.

Memory devices 140 each include memory resources 160. Memory resources 160 represent individual arrays of memory locations or storage locations for data. Typically memory resources 160 are managed as rows of data, accessed via wordline (rows) and bitline (individual bits within a row) control. Memory resources 160 can be organized as separate channels, ranks, and banks of memory. Channels may refer to independent control paths to storage locations within memory devices 140. Ranks may refer to common locations across multiple memory devices (e.g., same row addresses within different devices). Banks may refer to arrays of memory locations within a memory device 140. In one embodiment, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one embodiment, memory devices 140 include one or more registers 144. Register 144 represents one or more storage devices or storage locations that provide configuration or settings for the operation of the memory device. In one embodiment, register 144 can provide a storage location for memory device 140 to store data for access by memory controller 120 as part of a control or management operation. In one embodiment, register 144 includes one or more Mode Registers. In one embodiment, register 144 includes one or more multipurpose registers. The configuration of locations within register 144 can configure memory device 140 to operate in different "modes," where command information can trigger different operations within memory device 140 based on the mode. Additionally or in the alternative, different modes can also trigger different operation from address information or other signal lines depending on the mode. Settings of register 144 can indicate configuration for I/O settings (e.g., timing, termination or ODT (on-die termination) 146, driver configuration, or other I/O settings).

In one embodiment, memory device 140 includes ODT 146 as part of the interface hardware associated with I/O 142. ODT 146 can be configured as mentioned above, and provide settings for impedance to be applied to the interface to specified signal lines. In one embodiment, ODT 146 is applied to DQ signal lines. In one embodiment, ODT 146 is applied to command signal lines. In one embodiment, ODT 146 is applied to address signal lines. In one embodiment, ODT 146 can be applied to any combination of the preceding. The ODT settings can be changed based on whether a memory device is a selected target of an access operation or a non-target device. ODT 146 settings can affect the timing and reflections of signaling on the terminated lines. Careful control over ODT 146 can enable higher-speed operation with improved matching of applied impedance and loading. ODT 146 can be applied to specific signal lines of I/O interface 142, 122, and is not necessarily applied to all signal lines.

Memory device 140 includes controller 150, which represents control logic within the memory device to control internal operations within the memory device. For example, controller 150 decodes commands sent by memory controller 120 and generates internal operations to execute or satisfy the commands. Controller 150 can be referred to as an internal controller, and is separate from memory controller 120 of the host. Controller 150 can determine what mode is selected based on register 144, and configure the internal execution of operations for access to memory resources 160 or other operations based on the selected mode. Controller 150 generates control signals to control the routing of bits within memory device 140 to provide a proper interface for the selected mode and direct a command to the proper memory locations or addresses. Controller 150 includes command logic 152, which can decode command encoding received on command and address signal lines. Thus, command logic 152 can be or include a command decoder. With command logic 152, memory device can identify commands and generate internal operations to execute requested commands.

Referring again to memory controller 120, memory controller 120 includes command (CMD) logic 124, which represents logic or circuitry to generate commands to send to memory devices 140. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 140, memory controller 120 can issue commands via I/O 122 to cause memory device 140 to execute the commands. In one embodiment, controller 150 of memory device 140 receives and decodes command and address information received via I/O 142 from memory controller 120. Based on the received command and address information, controller 150 can control the timing of operations of the logic and circuitry within memory device 140 to execute the commands. Controller 150 is responsible for compliance with standards or specifications within memory device 140, such as timing and signaling requirements. Memory controller 120 can implement compliance with standards or specifications by access scheduling and control.

Memory controller 120 includes scheduler 130, which represents logic or circuitry to generate and order transactions to send to memory device 140. From one perspective, the primary function of memory controller 120 could be said to schedule memory access and other transactions to memory device 140. Such scheduling can include generating the transactions themselves to implement the requests for data by processor 110 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 120 typically includes logic such as scheduler 130 to allow selection and ordering of transactions to improve performance of system 100. Thus, memory controller 120 can select which of the outstanding transactions should be sent to memory device 140 in which order, which is typically achieved with logic much more complex that a simple first-in first-out algorithm. Memory controller 120 manages the transmission of the transactions to memory device 140, and manages the timing associated with the transaction. In one embodiment, transactions have deterministic timing, which can be managed by memory controller 120 and used in determining how to schedule the transactions with scheduler 130.

In one embodiment, memory controller 120 includes refresh (REF) logic 126. Refresh logic 126 can be used for memory resources that are volatile and need to be refreshed to retain a deterministic state. In one embodiment, refresh logic 126 indicates a location for refresh, and a type of refresh to perform. Refresh logic 126 can trigger self-refresh within memory device 140, or execute external refreshes which can be referred to as auto refresh commands) by sending refresh commands, or a combination. In one embodiment, system 100 supports all bank refreshes as well as per bank refreshes. All bank refreshes cause the refreshing of banks within all memory devices 140 coupled in parallel. Per bank refreshes cause the refreshing of a specified bank within a specified memory device 140. In one embodiment, controller 150 within memory device 140 includes refresh logic 154 to apply refresh within memory device 140. In one embodiment, refresh logic 154 generates internal operations to perform refresh in accordance with an external refresh received from memory controller 120. Refresh logic 154 can determine if a refresh is directed to memory device 140, and what memory resources 160 to refresh in response to the command.

In one embodiment, memory device 140 includes write pattern logic 180, which represents logic at the memory device to internally replace write data with a predefined data pattern, or to replace write data to change a pattern of the input data. In one embodiment, memory device 140 receives a write command from memory controller 120 over CMD 134. Typically, memory device 140 would read data from DQ 136 in conjunction with receiving the write command on CMD 134. Write pattern logic 180 enables memory device 140 to write a data pattern other than what appears on DQ 136. In one embodiment, with a write pattern command, memory controller 120 sends the command over CMD 134 and does not send write data on DQ 136. Write pattern logic 180 can be flexible enough to provide data for an entire burst on a data signal line, or for an entire burst for multiple data signal lines. Write pattern logic 180 can be flexible enough to replace a single bit in multiple signal lines. In one embodiment, write pattern logic 180 includes latches or comparable logic that can set and reset specific bits for serialization of data to the memory array for writing. In one embodiment, write pattern logic 180 is part of I/O logic 142.

In one embodiment, command logic 134 generates a write pattern command (WRP) for memory device 140. Upon receiving the command, memory device 140 source the input for the memory array of memory resources 160 from write pattern logic instead of from the DQ bits of DQ 136. In one embodiment, write pattern logic 180 reads the bits from register 144.

In one embodiment, memory controller 120 uses command logic 124 to generate a write pattern command to trigger memory device 140 to internally generate a data pattern for the write without having to send the data over DQ 136. I/O circuitry 122 drives the write pattern command in accordance with scheduling by scheduler 130. In one embodiment, command logic 124 determines that data to write to memory device 140 can be generated internally within the memory device. In one embodiment, based on determining that the memory device can internally generate the data pattern, the memory controller determines to generate and schedule a write pattern command instead of a normal write command. As such, memory controller 120 can avoid having to drive the data bus to send the data pattern. In one embodiment, memory controller 120 determines based on the pattern to write data to register 144. Thus, memory controller can provide a data pattern to memory device 140 that the memory device will use for multiple subsequent write commands.

Figure 2:
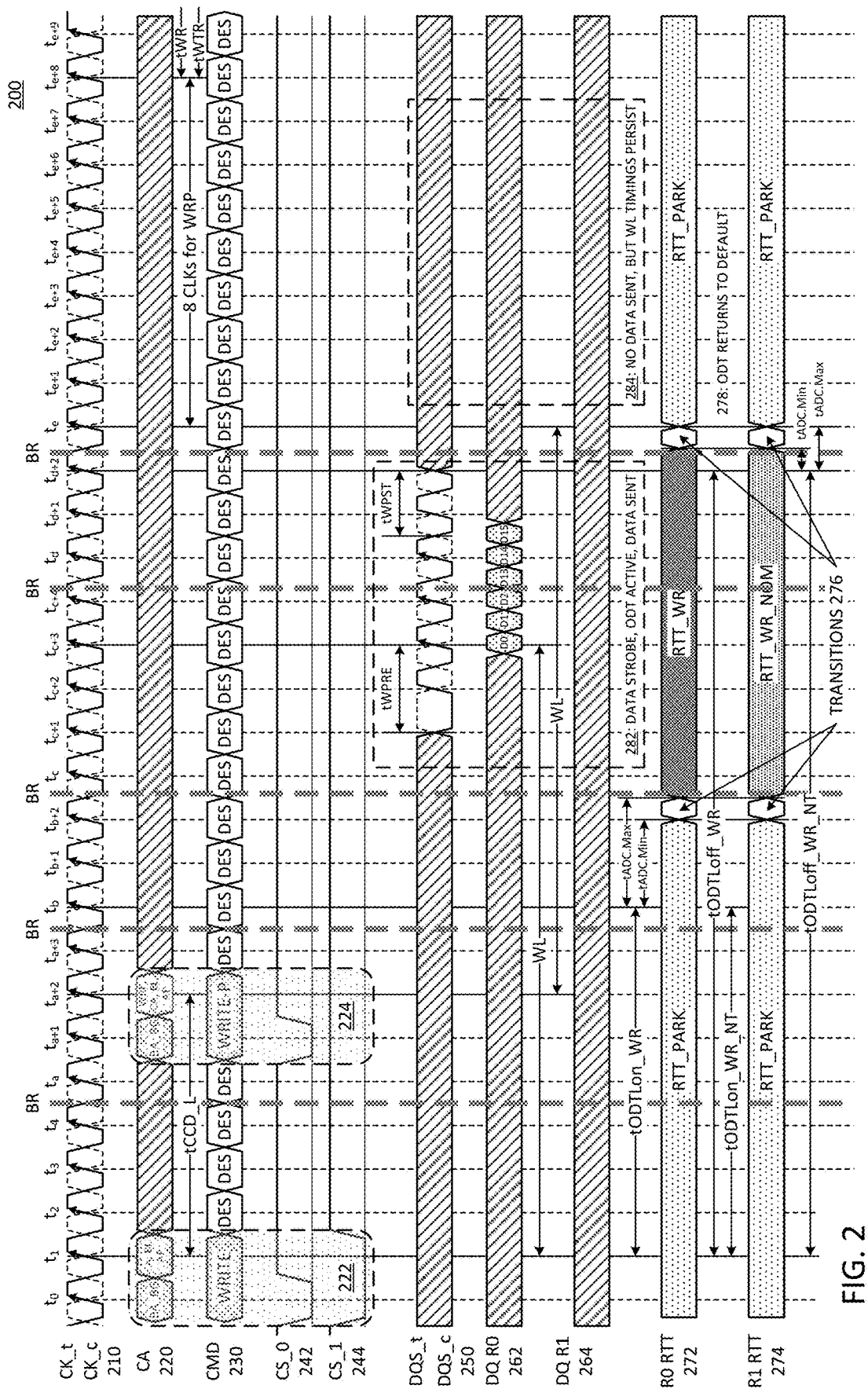
FIG. 2 is a timing diagram of an embodiment of a write pattern command.

FIG. 2 is a timing diagram of an embodiment of a write pattern command. Diagram 200 illustrates one example of a Write Pattern command that can be implemented in accordance with an embodiment of system 100. In one embodiment, upon receiving a command that indicates a data pattern, the DRAM device will source the input for the memory array from write pattern mode registers instead of from the DQ bits themselves. One example of a DQ mapping across the burst is illustrated in diagram 400 of FIG. 4. In one embodiment, the host will not send any data during this time. In one embodiment, all timing constraints are still measured from the clocks where the write command data would have been transferred, e.g., tWR is measured from the end of the write burst to PRE as illustrated in diagram 200.

The pattern used for this mode is enabled via a byte of mode registers. That pattern can be defaulted to all zeros, all ones, or some other bit pattern. In one embodiment, the selection of possible patterns can only be changed with initialization. In one embodiment, changing the pattern is accomplished via a MRW command. In one embodiment, the power on default state for such a mode register is all zeros.

Diagram 200 illustrates one embodiment of relative signal timings and signal levels for various signal lines or buses. Signal 210 illustrates the timing signal of a clock signal CK_t and complementary clock signal CK_c. DDR5 memory devices trigger operations on the rising clock edge, but other embodiments are possible. Diagram 200 illustrates multiple timing breaks, BR.

Signal CA 220 represents command signals driven on a command and address bus by an associated memory controller. Signal CMD 230 represents the decoding of the command within the memory device. It will be understood that typically a memory controller controls multiple memory devices in parallel, and therefore may drive other signals on CA 220 that are related to other devices. Only signals relevant to the example of diagram 200 are illustrated.

Signal CS_0 242 represents a chip select line for a memory device in Rank 0. Signal CS_1 244 represents a chip select line for a memory device in Rank 1. For purposes of the example of diagram 200, Rank 0 is a target rank, and Rank 1 is a non-target rank. The target rank is the rank selected to execute the command, and the non-target rank is a rank not selected to execute the command. Because the memory devices are connected in parallel with the memory controller, all devices generally receive the command signal, and determine what operations to execute based on a chip select line.

Signal DQS_t and DQS_c 250 represent the data strobe or timing signal corresponding to the data bus. Signaling on the data bus generates its timing from the data strobe. For convenience, the rising edges of DQS_t are aligned with CK_t, but it will be understood that in a practical implementation, there is typically a phase offset between the two signals, as DQS_t is delayed with respect to CK_t based on propagation delays. For DQS_c and CK_c, the complementary signals can be separately driven, or generated internally by the memory device, derived from the respective primary timing signal.

Signal DQ R0 262 represents the data bus signaling for target Rank 0. Signal DQ R1 264 represents the data bus signaling for non-target (NT) Rank 1. R0 RTT 272 represents the ODT for target Rank 0. R1 RTT 274 represents the ODT for non-target Rank 1.

Highlighted portion 222 represents signaling for a standard write command for an example of signaling for DDR5. Other implementations will be understood to potentially have different signaling specifics. CA 220 provides a bank address (BA) and bank group address (BG) for the write location, as well as a command signaling in a two-cycle write command. The command can include command signaling (CA), burst length indication (BL), and an Auto-Precharge designation (AP). CMD 230 illustrates the interpretation of the signal as a Write command. Corresponding data transfer area 282 illustrates the write timings of tWPRE write preamble from the start of the DQS signal until data is transferred, and tWPST write postamble from the end of transferring data until disabling the DQS signal. It will be observed that data D0:D15 is transferred on DQ R0 262, and nothing is transferred on DQ R1 264.

Highlighted portion 224 represents signaling for a write pattern command for an example of signaling for DDR5. CA 220 provides a bank address (BA) and bank group address (BG) for the write location, as well as a command signaling in a two-cycle write command. The command can include command signaling (CA), burst length indication (BL), and an Auto-Precharge designation (AP), where the CA designates a WRP. CMD 230 illustrates the interpretation of the signal as a Write-P or write pattern command. Corresponding data transfer area 284 illustrates that the DQS is not enabled, and no data is sent. In one embodiment, the write timings are still followed.

R0 RTT 272 illustrates a change in ODT for the traditional write command, where target Rank 0 applies RTT_WR and non-target Rank 1 applies RTT_WR_NOM. In one embodiment, ODT is provided with transitions 276 to represent timing required to transition from one ODT value to another. The transition timing can be governed by tADC.Min and tADC.Max parameters. Diagram 200 includes illustration of an example of ODT timing parameters.

FIG. 3 is a representation of an embodiment of write pattern configuration settings. Mode register 300 provides one example of write pattern mode register settings in accordance with one embodiment of diagram 200 and system 100. In one embodiment, OP[7:0] can be independently programmed with either "0" or "1". In one embodiment, the default state is all zeros for OP[7:0]. Mode register 300 is located at mode register address (MR ADDR) MRx Ay, referring to an addressable row of a mode register. The write pattern can identify a unit interval value. In one embodiment, the register can be programmed for a burst value instead of a unit interval value.

FIG. 4 is a representation of an embodiment of a data output mapping for a write pattern command. Diagram 400 provides one example of a DQ output mapping in accordance with an embodiment of diagram 200 and system 100. Diagram 400 illustrates a burst length of 16 UIs (BL16). In one embodiment, the DQ output mapping for BL16 describes how the pattern stored in the mode register of diagram 300 will be mapped into the DRAM array across the DQ bits and burst.

In one embodiment, in the case of a x4 SDRAM device, only OP[3:0] is used, with each bit of the pattern corresponding to DQ[3:0] respectively. The same OP value can be repeated over the entire burst for that bit. Thus, for example, DQ0 can provide OP0 for every UI of the burst.

In one embodiment, in the case of a x8 SDRAM device, the whole pattern OP[7:0] is used, with each bit of the pattern corresponding to DQ[7:0] respectively. The same OP value can be repeated over the entire burst for that bit. Thus, for example, DQ0 can provide OP0 for every UI of the burst.

In one embodiment, in the case of a x16 SDRAM device, the whole pattern OP[7:0] is used, with each bit of the pattern corresponding to DQ[7:0] respectively and then that pattern repeated for DQ[8:15]. The same OP value can be repeated over the entire burst for that bit. Thus, for example, DQ0 can provide OP0 for every UI of the burst.

Figure 5:
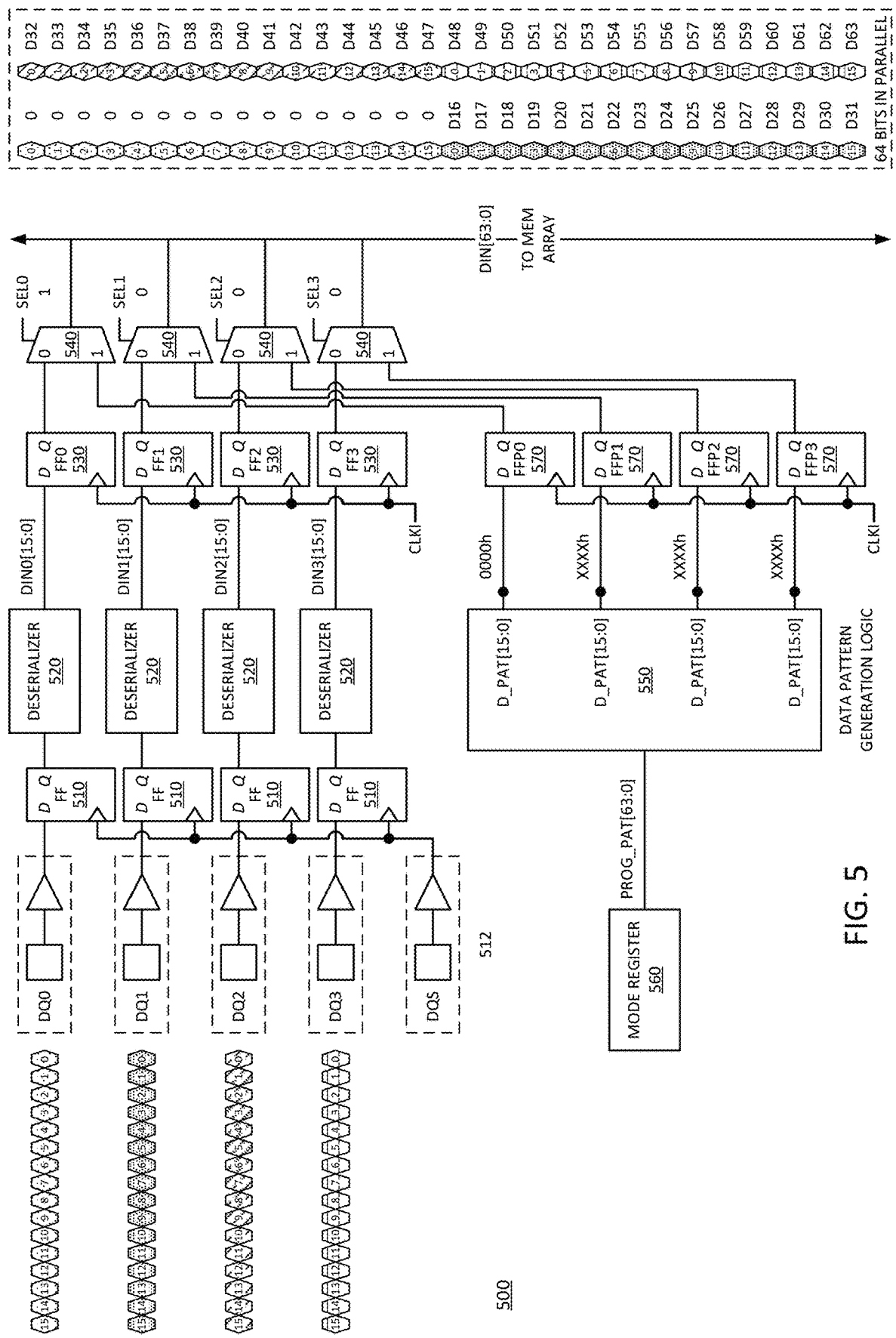
FIG. 5 is a block diagram of an embodiment of a write data replacement circuit with parallel registers.

FIG. 5 is a block diagram of an embodiment of a write data replacement circuit with parallel registers. Circuit 500 illustrates an example of a data replacement circuit for a data input buffer in accordance with an embodiment of system 100. As illustrated in circuit 500, a predefined data pattern can be generated inside the memory during writes. In one embodiment, the system provides a set of registers in parallel with the data alignment registers. In one embodiment, the data pattern can be programmed by a mode register the value of which is decoded by the data pattern generation logic to preset the data to a specified pattern. In this particular example, 16 bits from DQ0 are all replaced with a predefined data of "0000h".

Input registers 510 provide input latches for DQ ports 512. DQ0:DQ3 are illustrated as receiving a 16-bit burst, sampled in accordance with the DQS signal, with registers 510 operating as input registers. Deserializers 520 provide parallel input for the serial burst, as illustrated by DIN0 to DIN3. Data alignment register 530 trigger off CLKI to provide input to the data array. In one embodiment, system 500 includes register 570 in parallel with the data alignment registers 530, and the source can be selected by multiplexers 540, whether to take the data alignment data as input or the data from registers 570. The data for register 570 can be provided by data pattern generation logic 550. In one embodiment, data pattern generation logic 550 reads programmable program data from mode register 560 to generate the data pattern.

It will be understood that circuit 500 requires a large number of extra registers. For example, for DDR5 x4 DRAMs, the number of additional registers would be 64 (the four signal lines of the data interface times the burst length of 16), and could increase up to 512 in LPDDR4 for a x16 device with two channels (2 CH*x16*BL16), resulting in a large increase in chip size. Thus, circuit 500 provides the desired flexibility, but at the cost of a significant amount of circuitry, space, and power.

Figure 6:
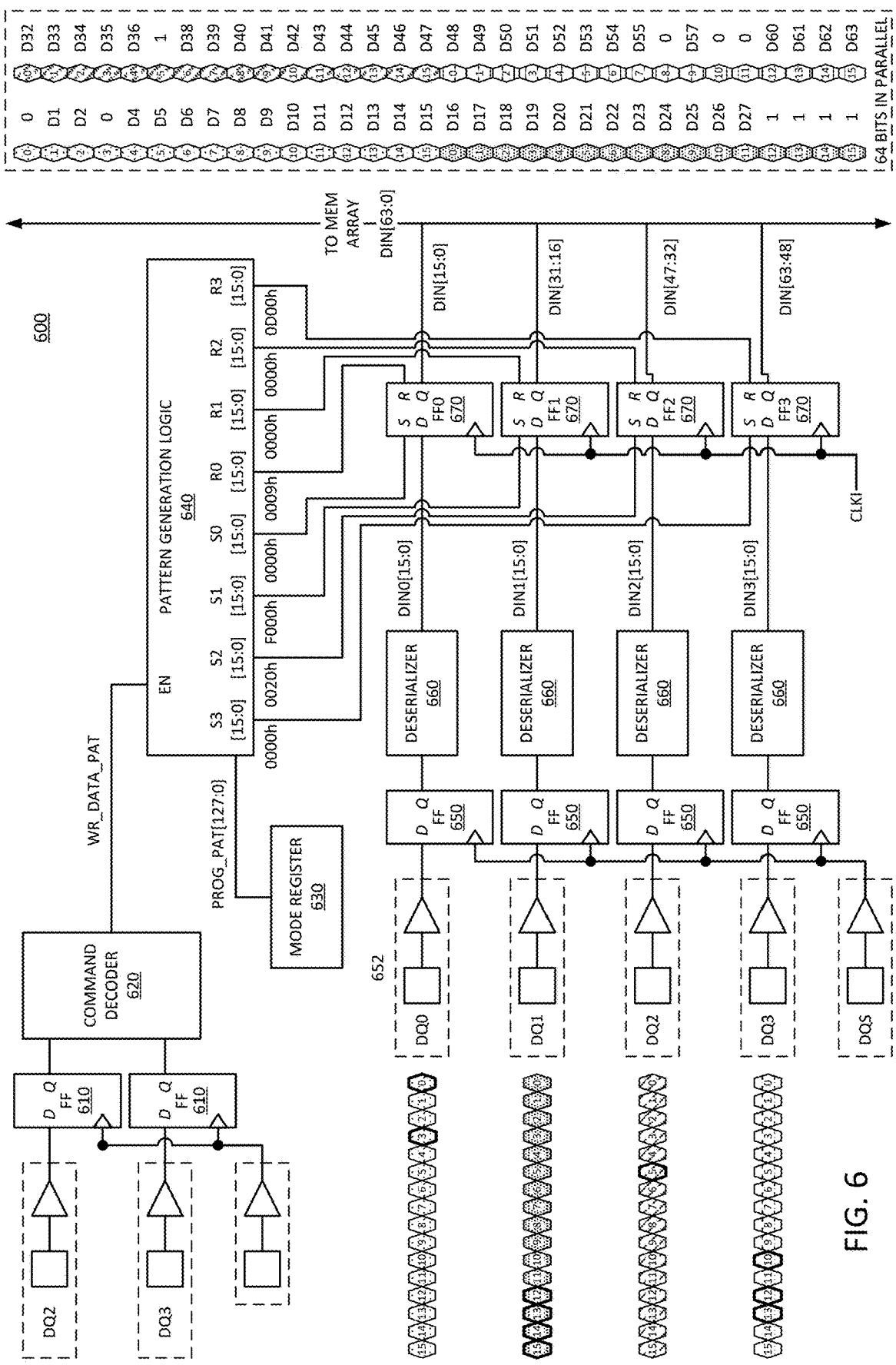
FIG. 6 is a block diagram of an embodiment of a write data replacement circuit with pattern generation control logic to replace individual bits.

FIG. 6 is a block diagram of an embodiment of a write data replacement circuit with pattern generation control logic to replace individual bits. Circuit 600 illustrates an example of a more efficient data replacement circuit in accordance with an embodiment of system 100, and is more efficient than system 500. In one embodiment of circuit 600, the data-alignment registers have set and reset capability to allow programming the register to a 1 or 0, either individually or as a group. As illustrated, all the individual bits in all bursts in all DQs can be selectively set either to 1 or 0. The input circuitry conveys the remaining bits to the memory array without changing the data contents; thus, the incoming serial data bits are not replaced with a 1 or 0.

Input registers 650 provide input latches for DQ ports 652. DQ0:DQ3 are illustrated as receiving a 16-bit burst, sampled in accordance with the DQS signal, with registers 650 operating as input registers. Deserializers 660 provide parallel input for the serial burst, as illustrated by DIN0 to DIN3.

In one embodiment, circuit 600 includes input latches 610 to receive command inputs 612. The command inputs can include command signals that identify a predefined data pattern. CMD0 and CMDn represent signal line inputs that can identify a write pattern command. In one embodiment, latches 610 include more than two latches to receive more command inputs. In one embodiment, only selected command signal lines (e.g., two) are needed to identify a write pattern command. Command decoder 620 can identify the command and generate an enable signal for pattern generation control logic 640. In one embodiment, input registers 610 can be enabled through a command enable signal, such as a chip select input.

Register 630 represents a register in which circuit 600 can store a programmable data pattern. In one embodiment, an associated memory controller programs register 630 through a mode register write operation to program the pattern to apply in response to a write pattern command. Thus, the mode register can provide a data bit for every input in a burst. In one embodiment, register 630 stores 128 bits, which is a byte of data for each of the 16 UIs or cycles of the write operation. Pattern generation logic 640 receives the programmable pattern from register 630 and generates set controls for S0:S3 and reset controls for R0:R3. In one embodiment, data alignment registers 670 include set and reset capability selectively controlled by pattern generation control logic 640. It will be observed that regardless of input from deserializers 660 into registers 670, when pattern generation control logic 640 is enabled, the logic can selectively control the inputs to force data patterns as the input to the memory array.

As observed in the data sent to the memory, represented by the 64 data bits, circuit 600 enables selectively setting and resetting random data bits. The flexibility of circuit 600 is that any random pattern, in whole or in part, can be generated on the inputs to the memory array. When pattern generation control logic 640 is enabled, it can selectively set an input to 1, reset an input to zero, or not set or reset a register but allow the input data to pass through to the memory array.

With an embodiment of circuit 600, different data patterns can be programmed by mode register 630. Pattern generation control logic 640 decodes the value of register 630 to set data alignment registers 670 with specific predefined data patterns. In one embodiment, control logic 640 allows generation of the set and reset signals to a selected few data patterns instead of programming the registers directly. Such control logic can further simplify the programming logic circuits and associated control wires. In one embodiment, pattern generation control logic 640 is enabled only when the command decoder decodes a command to write predefined data into the memory. In one embodiment, the set and reset are triggered by a logic high or "1" received from pattern generation control logic 640. In one embodiment, when pattern generation control logic 640 is disabled, all of outputs (S and R) are forced to 0 regardless of the mode register values, to avoid setting or resetting a data input. When enabled, pattern generation control logic 640 can trigger either the S or R output with a logic high, or leave both as logic low to allow the data input to pass through the respective register.

Circuit 600 allows fine granularity data programmability allowing any kind of data pattern replacements for all bursts in all DQs. The flexibility of circuit 600 is that not only can all data for all burst in all DQs be replaced, circuit 600 can be modified or configured or both to allow only a few predefined data pattern programmability in large data granularity. It will be understood that there is a tradeoff between circuit complexity to enable fine granularity control and data pattern programming flexibility.

Figure 7:
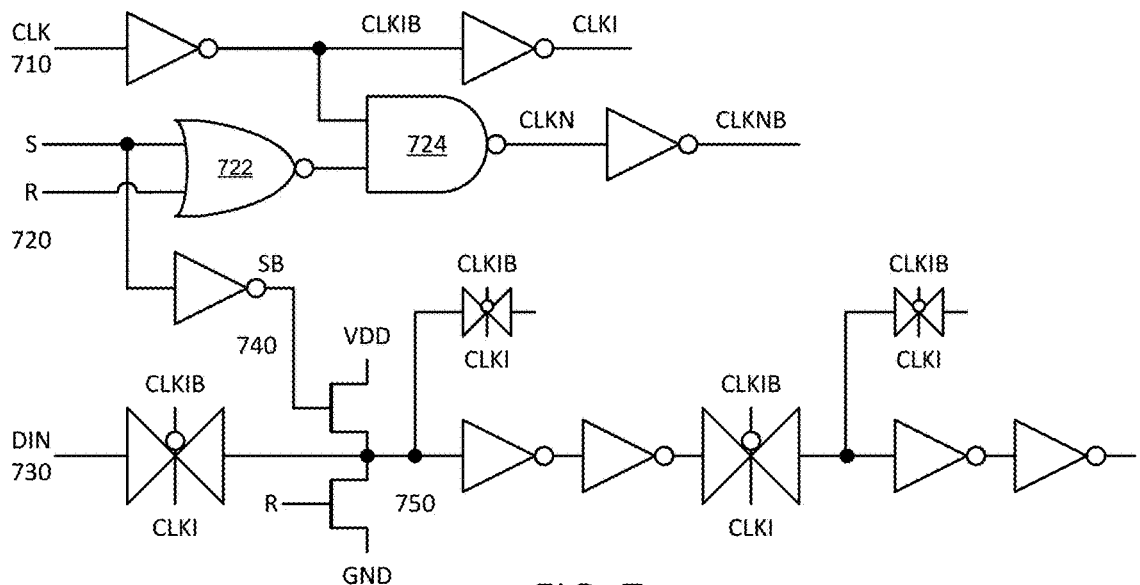
FIG. 7 is a block diagram of an embodiment of a positive edge triggered flip-flop having input data set and reset capability.

FIG. 7 is a block diagram of an embodiment of a positive edge triggered flip-flop having input data set and reset capability. Circuit 700 provides one example of a positive edge triggered flip-flop having input data set and reset capability in accordance with an embodiment of circuit 600. Circuit 700 can apply to any register with set and reset capability as described herein. In one embodiment, the set and reset register is designed to provide that the data input port "D" is blocked when the register input data is either set to a "1" or reset to a "0". In one embodiment, when both S and R signals are low, the register of circuit 700 operates as a regular positive edge triggered flip-flop.

CLK 710 represents a clock signal, and circuit 700 can generate a delayed clock by passing the clock signal through a first inverter to generate CLKIB and a second inverter to generate CLKI. In one embodiment, XOR (exclusive OR) gate 722 receives S and R inputs 720. XOR 722 provides an inverted output CLKIB as an input to NAND (not AND) gate 724, which ANDs the input with an inverted CLK signal to generate clock signal CLKN, and an inverted clock signal CLKNB through an inverter.

DIN 730 represents the data input at the D port of the register. In one embodiment, circuit 700 receives DIN through a transmission gate triggered by the CLKN signal at the inverted control gate and the CLKNB signal at the noninverted control gate. In one embodiment, the signal can be driven by the S and R inputs with an inverted S signal driving a pull up control gate and the R signal driving a pull down control gate. Various inverted and clock controlled transmission gates in path 750 can provide the final output.

Figure 8:
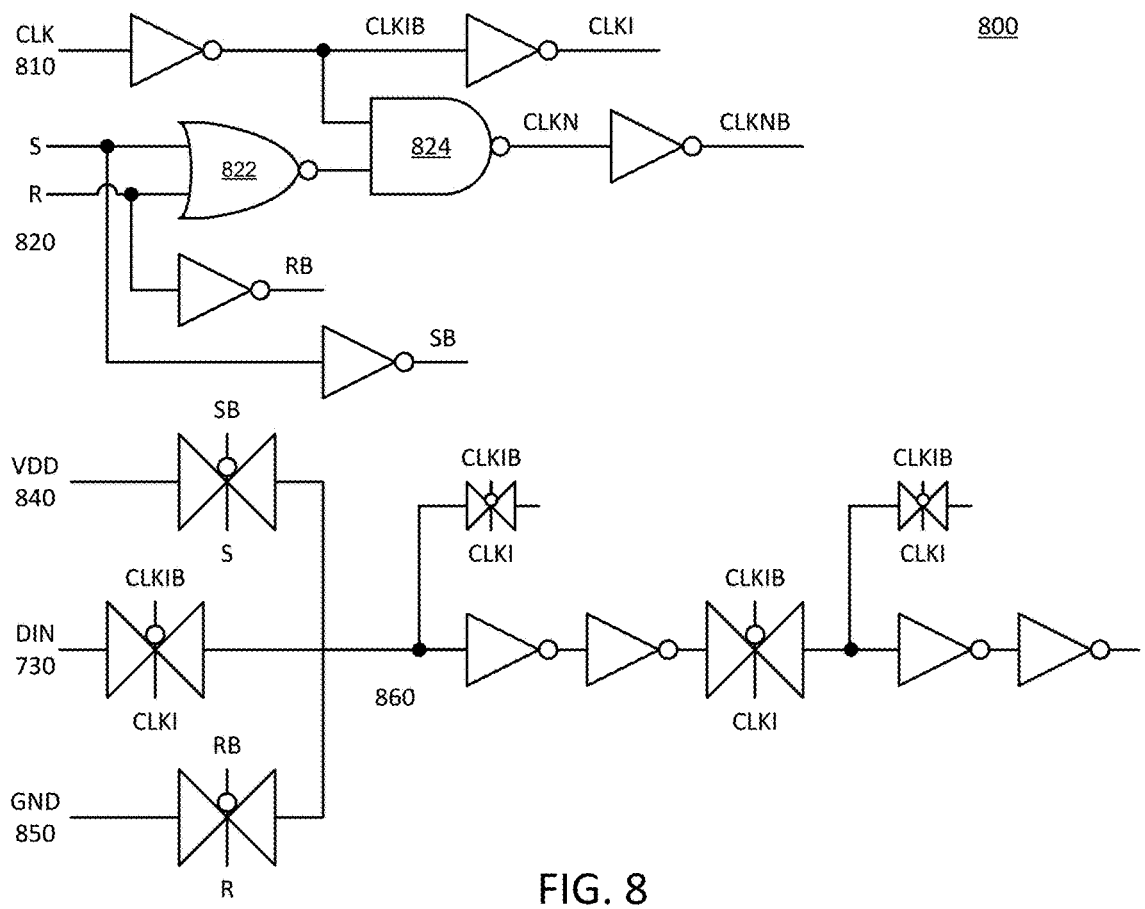
FIG. 8 is a block diagram of an embodiment of a positive edge triggered flip-flop having input data set and reset capability.

FIG. 8 is a block diagram of an embodiment of a positive edge triggered flip-flop having input data set and reset capability. Circuit 800 provides a second example of a positive edge triggered flip-flop having input data set and reset capability in accordance with an embodiment of circuit 600. Circuit 800 can apply to any register with set and reset capability as described herein. In one embodiment, the set and reset register is designed to provide that the data input port "D" is blocked when the register input data is either set to a "1" or reset to a "0". In one embodiment, when both S and R signals are low, the register of circuit 800 operates as a regular positive edge triggered flip-flop.

CLK 810 represents a clock signal, and circuit 800 can generate a delayed clock by passing the clock signal through a first inverter to generate CLKIB and a second inverter to generate CLKI. In one embodiment, XOR gate 822 receives S and R inputs 820. XOR 822 provides an inverted output CLKIB as an input to NAND gate 824, which ANDs the input with an inverted CLK signal to generate clock signal CLKN, and an inverted clock signal CLKNB through an inverter.

In one embodiment, circuit 800 includes VDD input 840 at a transmission gate controlled by S, and GND input 850 at a transmission gate controlled by R. DIN 830 represents the data input at the D port of the register. In one embodiment, circuit 800 receives DIN through a transmission gate triggered by the CLKN signal at the inverted control gate and the CLKNB signal at the noninverted control gate. In one embodiment, transmission gates are coupled in parallel to drive an output line to path 860, which will be driven high if S is asserted, driven low if R is asserted, or driven to the level of D. Various inverted and clock controlled transmission gates in path 860 can provide the final output.

Figure 9:
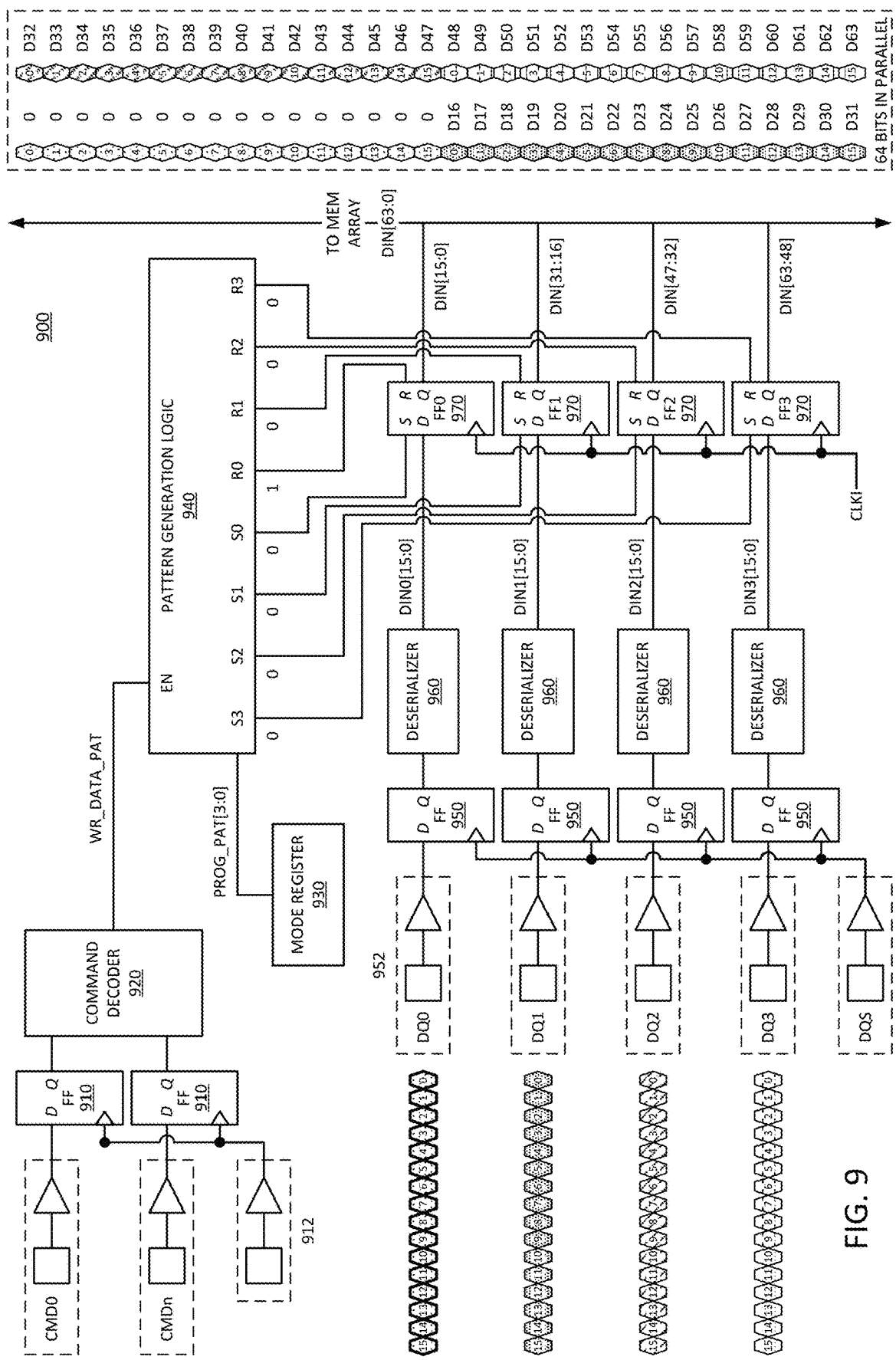
FIG. 9 is a block diagram of an embodiment of a write data replacement circuit where a data burst for a data signal line are set or reset simultaneously.

FIG. 9 is a block diagram of an embodiment of a write data replacement circuit where a data burst for a data signal line are set or reset simultaneously. Circuit 900 illustrates an example circuit configuration in accordance with an embodiment of diagram 200 and system 100 where all the 16 bursts of a DQ are set or reset simultaneously. Circuit 900 can be similar to circuit 600. As illustrated, the entire BL16 of DQ0 is set to zeros, resulting in bits D15:D0 to show zero. Ones could alternatively be used, or a different bit pattern. Bits D63:D16 can remain unaffected.

Input registers 950 provide input latches for DQ ports 952. DQ0:DQ3 are illustrated as receiving a 16-bit burst, sampled in accordance with the DQS signal, with registers 950 operating as input registers. Deserializers 960 provide parallel input for the serial burst, as illustrated by DIN0 to DIN3.

In one embodiment, circuit 900 includes input latches 910 to receive command inputs 912. The command inputs can include command signals that identify a predefined data pattern. CMD0 and CMDn represent signal line inputs that can identify a write pattern command. In one embodiment, latches 910 include more than two latches to receive more command inputs. In one embodiment, only selected command signal lines (e.g., two) are needed to identify a write pattern command. Command decoder 920 can identify the command and generate an enable signal for pattern generation control logic 940. In one embodiment, input registers 910 can be enabled through a command enable signal, such as a chip select input.

Register 930 represents a register in which circuit 900 can store a programmable data pattern. In one embodiment, an associated memory controller programs register 930 through a mode register write operation to program the pattern to apply in response to a write pattern command. Thus, the mode register can provide a data bit for every input in a burst. In one embodiment, register 930 stores a byte of data, and provides 4 bits for the operation of x4 input circuitry of circuit 900. Pattern generation logic 940 receives the programmable pattern from register 930 and generates set controls for S0:S3 and reset controls for R0:R3. In one embodiment, data alignment registers 970 include set and reset capability selectively controlled by pattern generation control logic 940. It will be observed that regardless of input from deserializers 960 into registers 970, when pattern generation control logic 940 is enabled, the logic can selectively control the inputs to force data patterns as the input to the memory array.

As observed in the data sent to the memory, represented by the 64 data bits, circuit 900 enables selectively setting and resetting bursts of data bits for an input. When pattern generation control logic 940 is enabled, it can selectively set an input to 1, reset an input to zero, or not set or reset a register but allow the input data to pass through to the memory array. Setting or resetting a data alignment register can operate to set the entire burst of data for the register. Circuit 900 can be effectively to implement all ones or all zeros for a burst for any DQ input. For patterns that toggle over a burst, circuit 900 may not provide the flexibility to toggle the input of a specific signal line over the burst as a preset pattern, but can selectively set or reset data bits for a data bit for an entire write data burst.

Figure 10:
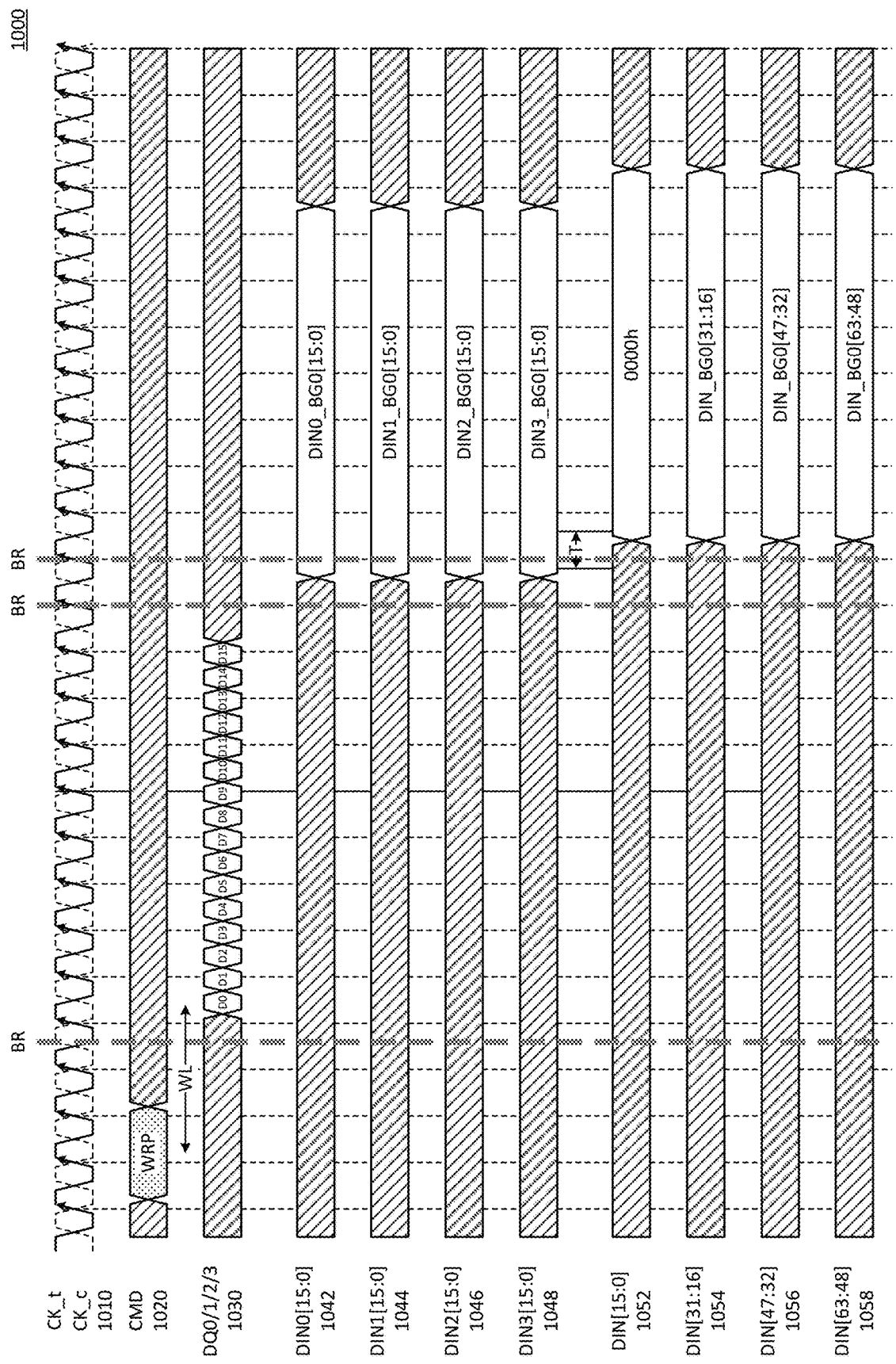
FIG. 10 is a timing diagram of an embodiment of data write with predefined data patterns.

FIG. 10 is a timing diagram of an embodiment of data write with predefined data patterns. Diagram 1000 illustrates one example of a timing diagram in accordance with an embodiment of data writes with predefined data patterns in accordance with circuit 900.

Signal line 1010 represents a clock signal with a primary clock CK_t and a complementary clock CK_c. Command (CMD) signal line 1020 represents a command as decoded from a signal received on a CA bus. Command signal line 1020 indicates a write pattern command (WRP) for BG0.

Signal line 1030 represents the DQ input burst for DQ0, DQ1, DQ2, and DQ3 for a x4 interface. A x8 interface would include DQ4:DQ7, and interfaces of greater widths would include corresponding data inputs. Signal line 1030 represents a BL16, but could be any burst length in accordance with the implementation of the memory device. The data burst occurs after a delay of WL or write latency.

After propagation and input latching delays, the data appears as data input on the various signal line groups. DIN0 signal line 1042 represents input data DIN0_BG0[15:0], DIN1 signal line 1044 represents input data DIN1_BG0[15:0], DIN2 signal line 1046 represents input data DIN2 BG0[15:0], and DIN3 signal line 1048 represents input data DIN3 BG0[15:0], which are the 16 bits for each input. In accordance with the example of FIG. 9, the data for DQ0 is a pattern of all zeros, while the other data signal lines (DQ) is not a preset burst pattern. Thus, in one embodiment, the memory controller does not drive the data on DQ0, and the data input is not valid. Even with sampling by the input hardware, the signal line can float resulting in unreliable data sampling readings for the input in accordance with the write pattern command.

DIN[15:0] signal line 1052 represents the input to send to the memory array, and has been changed from whatever was sampled from the DQ to all zeros. DIN[31:16] signal line 1054 represents input data for DQ1 or driven on the signal line. DIN[47:32] signal line 1056 represents input data for DQ2. DIN[63:48] signal line 1058 represents input data DQ3.

Figure 11:
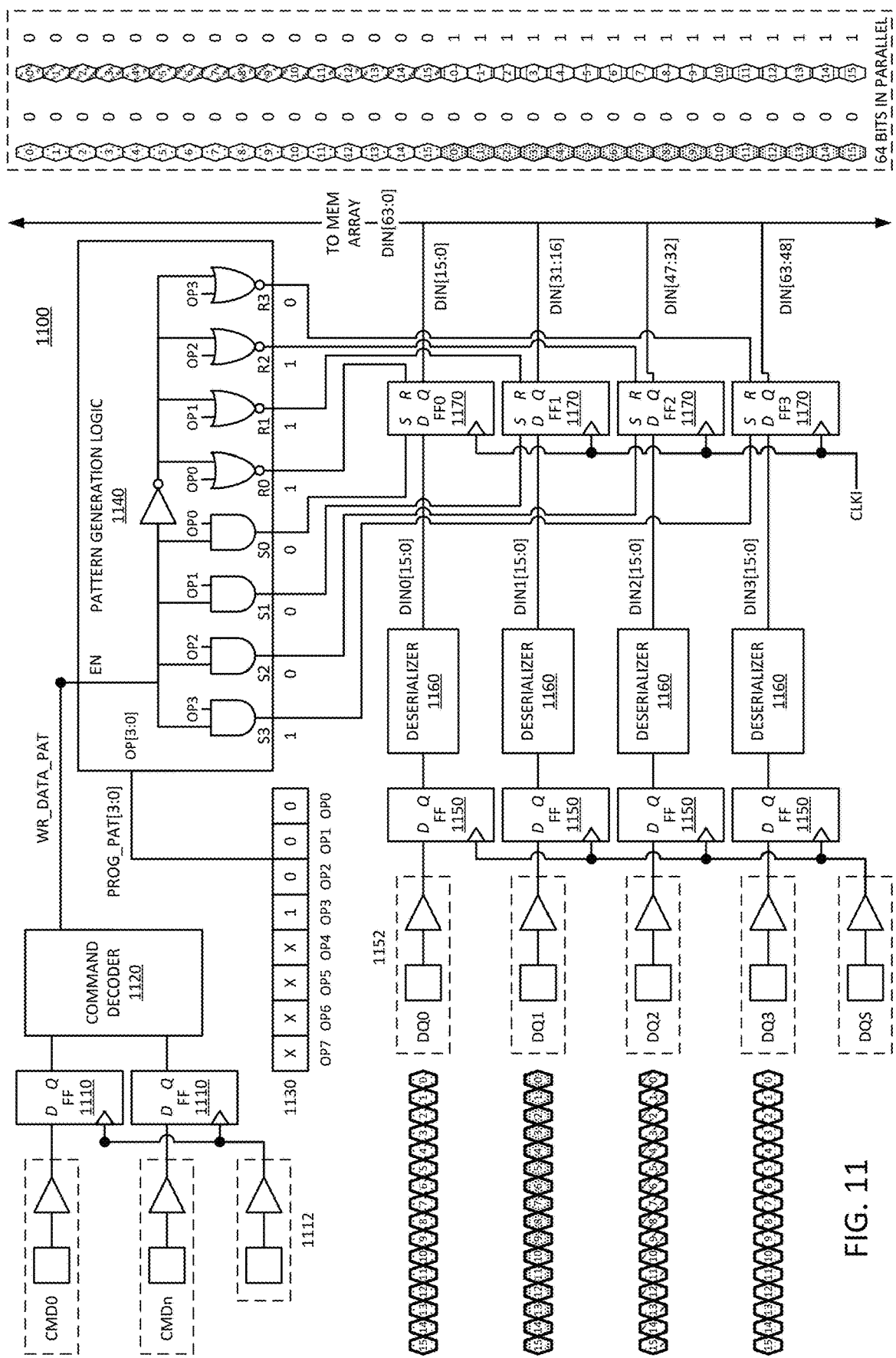
FIG. 11 is a block diagram of an embodiment of a write data replacement circuit where data bursts for different signal lines are set or reset simultaneously.

FIG. 11 is a block diagram of an embodiment of a write data replacement circuit where data bursts for different signal lines are set or reset simultaneously. Circuit 1100 illustrates an example circuit configuration in accordance with an embodiment of diagram 200 and system 100. Circuit 1100 can be understood as an example of a case when all the bursts in all DQ0/DQ1/DQ2 are reset to 0 and DQ3 are set to 1. Circuit 1100 illustrates one embodiment of details of the pattern generation control logic.

Input registers 1150 provide input latches for DQ ports 1152. DQ0:DQ3 are illustrated as receiving a 16-bit burst, sampled in accordance with the DQS signal, with registers 1150 operating as input registers. Deserializers 1160 provide parallel input for the serial burst, as illustrated by DIN0 to DIN3.

In one embodiment, circuit 1100 includes input latches 1110 to receive command inputs 1112. The command inputs can include command signals that identify a predefined data pattern. CMD0 and CMDn represent signal line inputs that can identify a write pattern command. In one embodiment, latches 1110 include more than two latches to receive more command inputs. In one embodiment, only selected command signal lines (e.g., two) are needed to identify a write pattern command. Command decoder 1120 can identify the command and generate an enable signal for pattern generation control logic 1140. In one embodiment, input registers 1110 can be enabled through a command enable signal, such as a chip select input.

Register 1130 represents a register in which circuit 1100 can store a programmable data pattern. In one embodiment, an associated memory controller programs register 1130 through a mode register write operation to program the pattern to apply in response to a write pattern command. As illustrated, register 1130 has storage for a byte of data. In one embodiment, only four bits are programmed for the x4 interface implementation of circuit 1100. In one embodiment, the whole byte is programmed, but only opcodes OP3:OP0 are used for programming pattern generation control logic 1140.

In one embodiment, pattern generation control logic 1140 is configured to apply the opcode bits to selectively set or reset (or not affect) corresponding data bits based on if the opcode bit in the mode register is set to 1 or to 0. In one embodiment, the enable signal gates all logic stages to force the output to zeros if the enable signal is set to 0. In one embodiment, if the enable signal is set high, the opcode information is passed through the logic gates. For a x8 memory device, the x4 case illustrated in circuit 1100 can be duplicated with the mode register opcode bits and the associated logic extended to 8 bits. By extension, bit widths beyond x4 and x8 can also be implemented.

In the specific example, OP3 is a 1 and OP2:OP0 are 0. Thus, R0, R1, and R2 output a one to trigger the reset of corresponding data alignment registers 1170, while R3 drives a zero. S3 drives a one while S2:S0 are zero, to trigger the DIN3 data alignment register to output ones. None of the inputs drive their sample input in the example illustrated.

Figure 12:
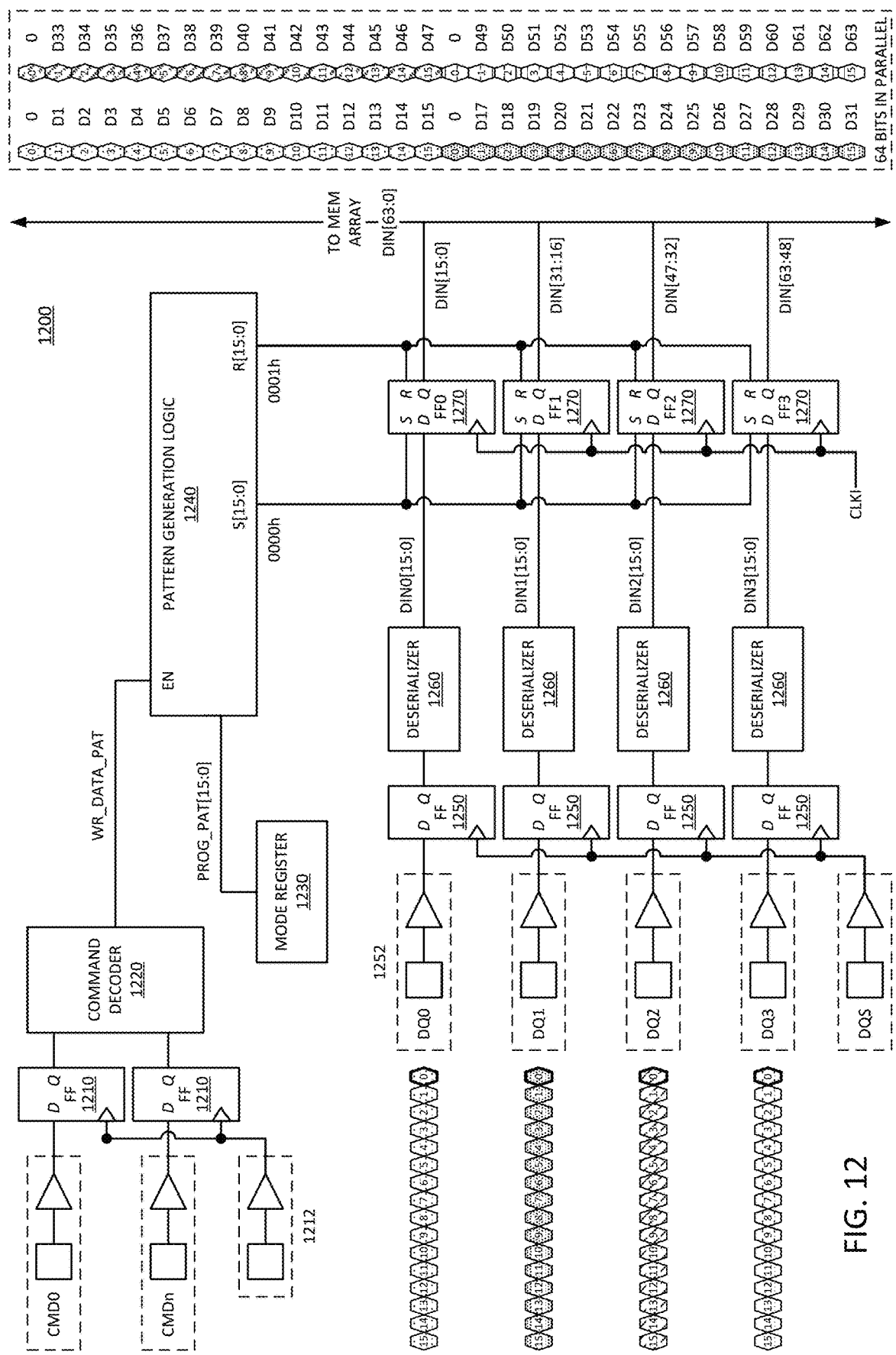
FIG. 12 is a block diagram of an embodiment of a write data replacement circuit where only a first bit in a data burst for all signal lines is set or reset simultaneously.

FIG. 12 is a block diagram of an embodiment of a write data replacement circuit where only a first bit in a data burst for all signal lines is set or reset simultaneously. Circuit 1200 illustrates an example circuit configuration in accordance with an embodiment of diagram 200 and system 100. As illustrated, the circuit configuration of circuit 1200 provides identical burst locations in all DQs to be either set or reset simultaneously. As illustrated, it is assumed that only the first cycle or UI in the burst is reset to 0.

Input registers 1250 provide input latches for DQ ports 1252. DQ0:DQ3 are illustrated as receiving a 16-bit burst, sampled in accordance with the DQS signal, with registers 1250 operating as input registers. Deserializers 1260 provide parallel input for the serial burst, as illustrated by DIN0 to DIN3.

In one embodiment, circuit 1200 includes input latches 1210 to receive command inputs 1212. The command inputs can include command signals that identify a predefined data pattern. CMD0 and CMDn represent signal line inputs that can identify a write pattern command. In one embodiment, latches 1210 include more than two latches to receive more command inputs. In one embodiment, only selected command signal lines (e.g., two) are needed to identify a write pattern command. Command decoder 1220 can identify the command and generate an enable signal for pattern generation control logic 1240. In one embodiment, input registers 1210 can be enabled through a command enable signal, such as a chip select input.

Register 1230 represents a register in which circuit 1200 can store a programmable data pattern. In one embodiment, an associated memory controller programs register 1230 through a mode register write operation to program the pattern to apply in response to a write pattern command.

In one embodiment, pattern generation control logic 1240 is configured to selectively apply the same set or reset selection to all data alignment registers 1270 corresponding to a programmed configuration. Thus, set and reset can output in accordance with input UIs. As illustrated, reset applies to the first UI, and set is not applied. The result is that D0, D16, D32, and D48 are set to zero. The other data bits can remain unaffected.

Descriptions provide examples of resetting entire bursts or resetting all UIs of a burst, resetting individual UIs of a burst across all DQs, and resetting individual bits or individual UIs of individual DQs. Different embodiments can include input circuitry capable of one or all of such functions. Thus, the input circuitry can be configured for differing complexity depending on the resolution of control desired.

FIG. 13 is a representation of an embodiment of a command truth table compatible with a write pattern command. Diagram 1300 illustrates an example of command encoding. It will be understood that certain commands are multicycle, and others are single cycle. For example, as illustrated, all Read and Write commands include two cycles, or consecutive bursts of signals over the command bus, without intervening signaling occurring on the command bus. The second cycle can provide the data payload address information, and other signals regarding the performance of the access command. Thus, the memory device can execute the command at the address to either receive data on the data bus (for Writes or write transactions) or place data on the data bus (for Reads or read transactions).

In one embodiment, Read commands and MRR commands use the same termination and do not need to be differentiated by the DRAM in powerdown. Similarly, in one embodiment, Write commands and MRW commands use the same termination and do not need to be differentiated by the DRAM in powerdown. In one embodiment, the MRW commands only require termination when in per DRAM addressability (PDA) mode.

In one embodiment, proper termination on the bus by a DRAM may require information about the burst length, to know how long to apply the termination. In one embodiment, the burst length can either be fixed to 8 or 16 via MR bits, in which case the DRAM does not need burst length information with the command because it can be read from the mode register. In one embodiment, the burst length can be set to "Burst on the Fly" (e.g., by MR setting), in which case the burst length is set on a command-by-command basis. The best termination would be provided when the terminating DRAM knows the burst length as set by a BL bit in the command encoding. In one embodiment, the BL bit can be provided on the same selected CA signal lines used to detect Read and Write commands. For example, the Read or Write can be indicated on a first cycle of the command, and the BL can be indicated on one of the bits in the second cycle (e.g., on the second cycle of CA4 for commands requiring termination). In such an implementation, there are three bits of information for a DRAM to provide termination, and all three bits can be carried on two signal lines over the two cycles of the command.

In one embodiment, CS signaling that includes CS active on the first cycle only indicates a DRAM that is the target of the command. In one embodiment, CS signaling that includes CS active for the first and second cycles indicates the DRAM is not the target but should enable non-target termination (e.g., RTT_NOM). A CS signal may be active low. In one embodiment, CS signaling that includes CS not active for either the first or second cycles indicates the DRAM does not see the command and remains in Park termination (e.g., RTT_Park). Thus, CS signal encoding can trigger ODT.

For table 1300, the legend can be as follows: AP=Auto Precharge; BG=bank group address; BA=bank address; R=row address; C=column address; BC8=burst chop 8; MRA=mode register address; OP=opcode; CID=chip identifier; CW=control word; H=logic high; L=logic low; X=Don't Care or it does not matter what state the signal has, and the signal may be floated; and, V=valid meaning any valid signal state, or more specifically, either high or low.

In one embodiment, as set out in table 1300, a write pattern command WRP can be implemented with a command encoding of CA0:CA5 of '10010b', where 1=H and 0=L. It will be observed that WRP can differ from a traditional WR command in that CA2 is toggled, where WR has a command encoding of CA0:CA5 of '10110b'. WRP can trigger a write pattern operation in accordance with any embodiment described herein.

Figure 14:
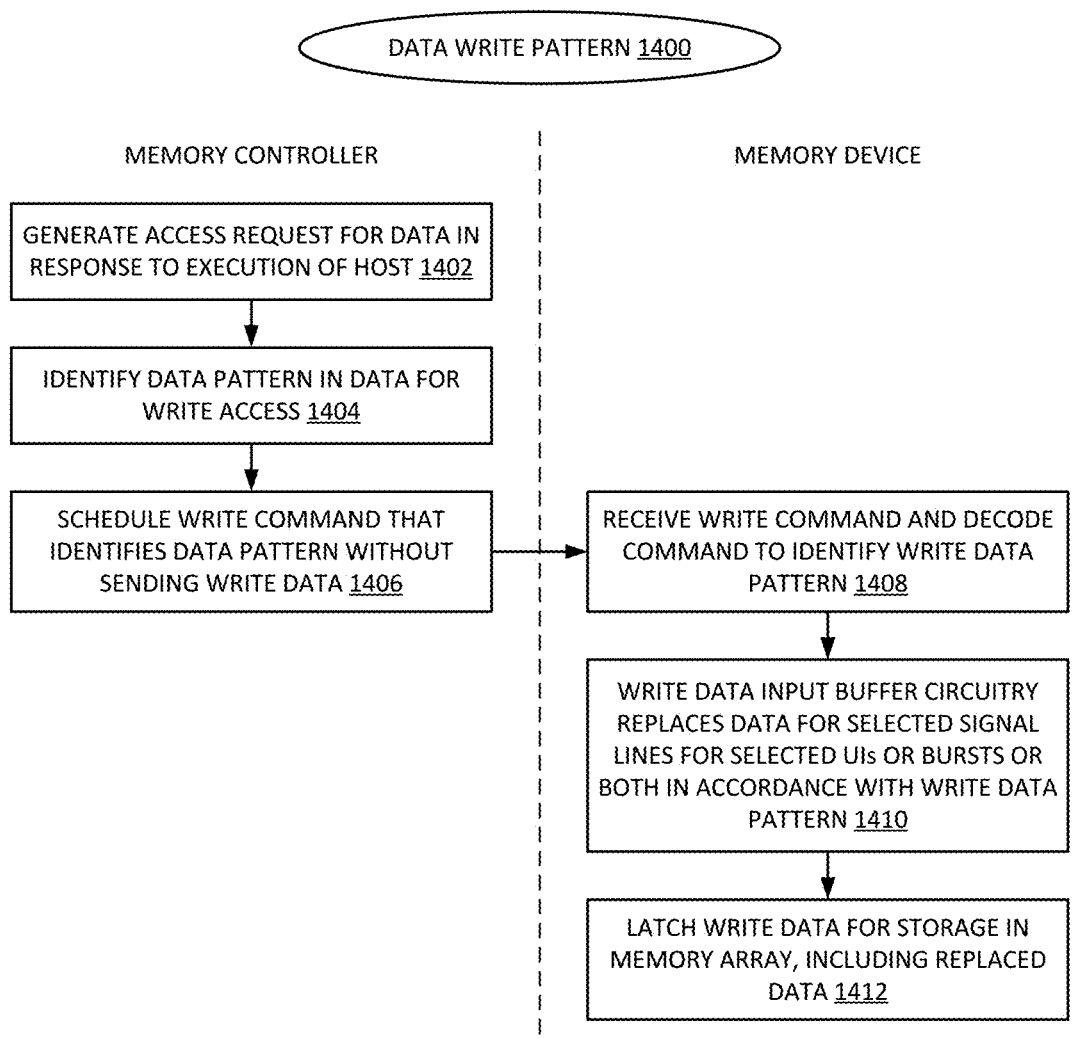
FIG. 14 is a flow diagram of an embodiment of a process for write data replacement.

FIG. 14 is a flow diagram of an embodiment of a process for write data replacement. Process 1400 illustrates one example of data write pattern processing in accordance with an embodiment of system 100. The execution of the host generates requests for data from the memory resources. The memory controller generates an access request for the data in response to the execution by the host, 1402. In one embodiment, the memory controller identifies a data pattern in write data for a write access operation, 1404. In one embodiment, the memory controller schedules a write command that identifies the data pattern without sending the actual write data over the data bus, 1406.

The memory device receives the write command from the memory controller, and in one embodiment, the command control circuitry decodes the command to identify the write data pattern, 1408. In one embodiment, the circuitry identifies the pattern in accordance with command bits and a mode register or other configuration register on the memory device. In one embodiment, the memory device write data input buffer circuitry replaces data for selected signal lines for selected UIs, bursts, or a combination, in accordance with the identified pattern, 1410. The replacement can be in accordance with any embodiment of selectively applying set and reset or other selectively providing specific write data pattern information. In one embodiment, the memory device latches the write data for storage in the memory array, including the replaced data, 1412.

Figure 15:
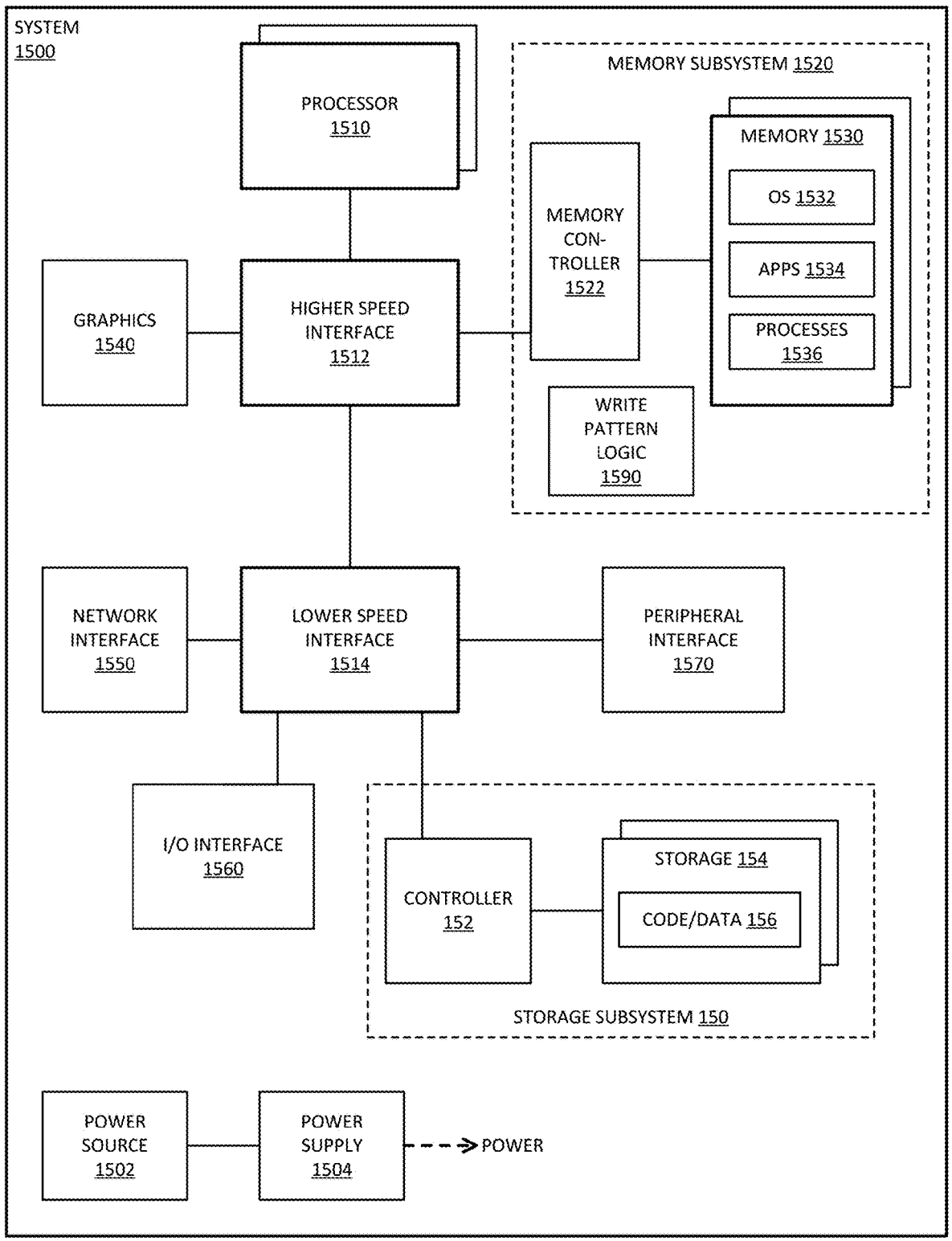
FIG. 15 is a block diagram of an embodiment of a computing system in which write data pattern replacement can be implemented.

FIG. 15 is a block diagram of an embodiment of a computing system in which write data pattern replacement can be implemented. System 1500 represents a computing device in accordance with any embodiment described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 1500 includes processor 1510, which provides processing, operation management, and execution of instructions for system 1500. Processor 1510 can include any type of microprocessor, central processing unit (CPU), graphics processing unit (GPU), processing core, or other processing hardware to provide processing for system 1500, or a combination of processors. Processor 1510 controls the overall operation of system 1500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 1500 includes interface 1512 coupled to processor 1510, which can represent a higher speed interface or a high throughput interface for system components that needs higher bandwidth connections, such as memory subsystem 1520 or graphics interface components 1540. Interface 1512 represents an interface circuit, which can be a standalone component or integrated onto a processor die. Where present, graphics interface 1540 interfaces to graphics components for providing a visual display to a user of system 1500. In one embodiment, graphics interface 1540 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, the display can include a touchscreen display. In one embodiment, graphics interface 1540 generates a display based on data stored in memory 1530 or based on operations executed by processor 1510 or both. In one embodiment, graphics interface 1540 generates a display based on data stored in memory 1530 or based on operations executed by processor 1510 or both.

Memory subsystem 1520 represents the main memory of system 1500, and provides storage for code to be executed by processor 1510, or data values to be used in executing a routine. Memory subsystem 1520 can include one or more memory devices 1530 such as read-only memory (ROM), flash memory, one or more varieties of random access memory (RAM) such as DRAM, or other memory devices, or a combination of such devices. Memory 1530 stores and hosts, among other things, operating system (OS) 1532 to provide a software platform for execution of instructions in system 1500. Additionally, applications 1534 can execute on the software platform of OS 1532 from memory 1530. Applications 1534 represent programs that have their own operational logic to perform execution of one or more functions. Processes 1536 represent agents or routines that provide auxiliary functions to OS 1532 or one or more applications 1534 or a combination. OS 1532, applications 1534, and processes 1536 provide software logic to provide functions for system 1500. In one embodiment, memory subsystem 1520 includes memory controller 1522, which is a memory controller to generate and issue commands to memory 1530. It will be understood that memory controller 1522 could be a physical part of processor 1510 or a physical part of interface 1512. For example, memory controller 1522 can be an integrated memory controller, integrated onto a circuit with processor 1510.

While not specifically illustrated, it will be understood that system 1500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one embodiment, system 1500 includes interface 1514, which can be coupled to interface 1512. Interface 1514 can be a lower speed interface than interface 1512. In one embodiment, interface 1514 represents an interface circuit, which can include standalone components and integrated circuitry. In one embodiment, multiple user interface components or peripheral components, or both, couple to interface 1514. Network interface 1550 provides system 1500 the ability to communicate with remote devices (e.g., servers or other computing devices) over one or more networks. Network interface 1550 can include an Ethernet adapter, wireless interconnection components, cellular network interconnection components, USB (universal serial bus), or other wired or wireless standards-based or proprietary interfaces. Network interface 1550 can exchange data with a remote device, which can include sending data stored in memory or receiving data to be stored in memory.

In one embodiment, system 1500 includes one or more input/output (I/O) interface(s) 1560. I/O interface 1560 can include one or more interface components through which a user interacts with system 1500 (e.g., audio, alphanumeric, tactile/touch, or other interfacing). Peripheral interface 1570 can include any hardware interface not specifically mentioned above. Peripherals refer generally to devices that connect dependently to system 1500. A dependent connection is one where system 1500 provides the software platform or hardware platform or both on which operation executes, and with which a user interacts.

In one embodiment, system 1500 includes storage subsystem 1580 to store data in a nonvolatile manner. In one embodiment, in certain system implementations, at least certain components of storage 1580 can overlap with components of memory subsystem 1520. Storage subsystem 1580 includes storage device(s) 1584, which can be or include any conventional medium for storing large amounts of data in a nonvolatile manner, such as one or more magnetic, solid state, or optical based disks, or a combination. Storage 1584 holds code or instructions and data 1586 in a persistent state (i.e., the value is retained despite interruption of power to system 1500). Storage 1584 can be generically considered to be a "memory," although memory 1530 is typically the executing or operating memory to provide instructions to processor 1510. Whereas storage 1584 is nonvolatile, memory 1530 can include volatile memory (i.e., the value or state of the data is indeterminate if power is interrupted to system 1500). In one embodiment, storage subsystem 1580 includes controller 1582 to interface with storage 1584. In one embodiment controller 1582 is a physical part of interface 1514 or processor 1510, or can include circuits or logic in both processor 1510 and interface 1514.

Power source 1502 provides power to the components of system 1500. More specifically, power source 1502 typically interfaces to one or multiple power supplies 1504 in system 1502 to provide power to the components of system 1500. In one embodiment, power supply 1504 includes an AC to DC (alternating current to direct current) adapter to plug into a Ilwall outlet. Such AC power can be renewable energy (e.g., solar power) power source 1502. In one embodiment, power source 1502 includes a DC power source, such as an external AC to DC converter. In one embodiment, power source 1502 or power supply 1504 includes wireless charging hardware to charge via proximity to a charging field. In one embodiment, power source 1502 can include an internal battery or fuel cell source.

In one embodiment, memory subsystem 1520 includes write pattern logic 1590, which represents logic at the memory device to internally replace write data with a predefined data pattern, or to replace write data to change a pattern of the input data. In one embodiment, memory device 1530 receives a write command from memory controller 1522, which can include a write command that indicates a data pattern without sending the data over one or more signal lines. Write pattern logic 1590 enables memory subsystem 1520 to cause memory 1530 to write a data pattern other than what appears the data bus. In one embodiment, with a write pattern command, memory controller 1522 sends a command, and logic internal to memory 1530 decodes the command and writes a pattern of data to the data array. In one embodiment, memory 1530 decodes the command to identify the write pattern in accordance with a mode register setting or other configuration. Write pattern logic 1590 can be in accordance with any embodiment described herein. Write pattern logic 1590 can be flexible enough to provide data for an entire burst on a data signal line, or for an entire burst for multiple data signal lines. Write pattern logic 1590 can be flexible enough to replace a single bit in multiple signal lines. In one embodiment, write pattern logic 1590 includes latches or comparable logic that can set and reset specific bits for serialization of data to the memory array for writing. In one embodiment, write pattern logic 1590 represents both logic within memory 1530 to decode and write replacement data in response to a command, as well as logic within memory controller 1522 to generate a decoded write command to avoid sending data over a data bus to memory 1530.

Figure 16:
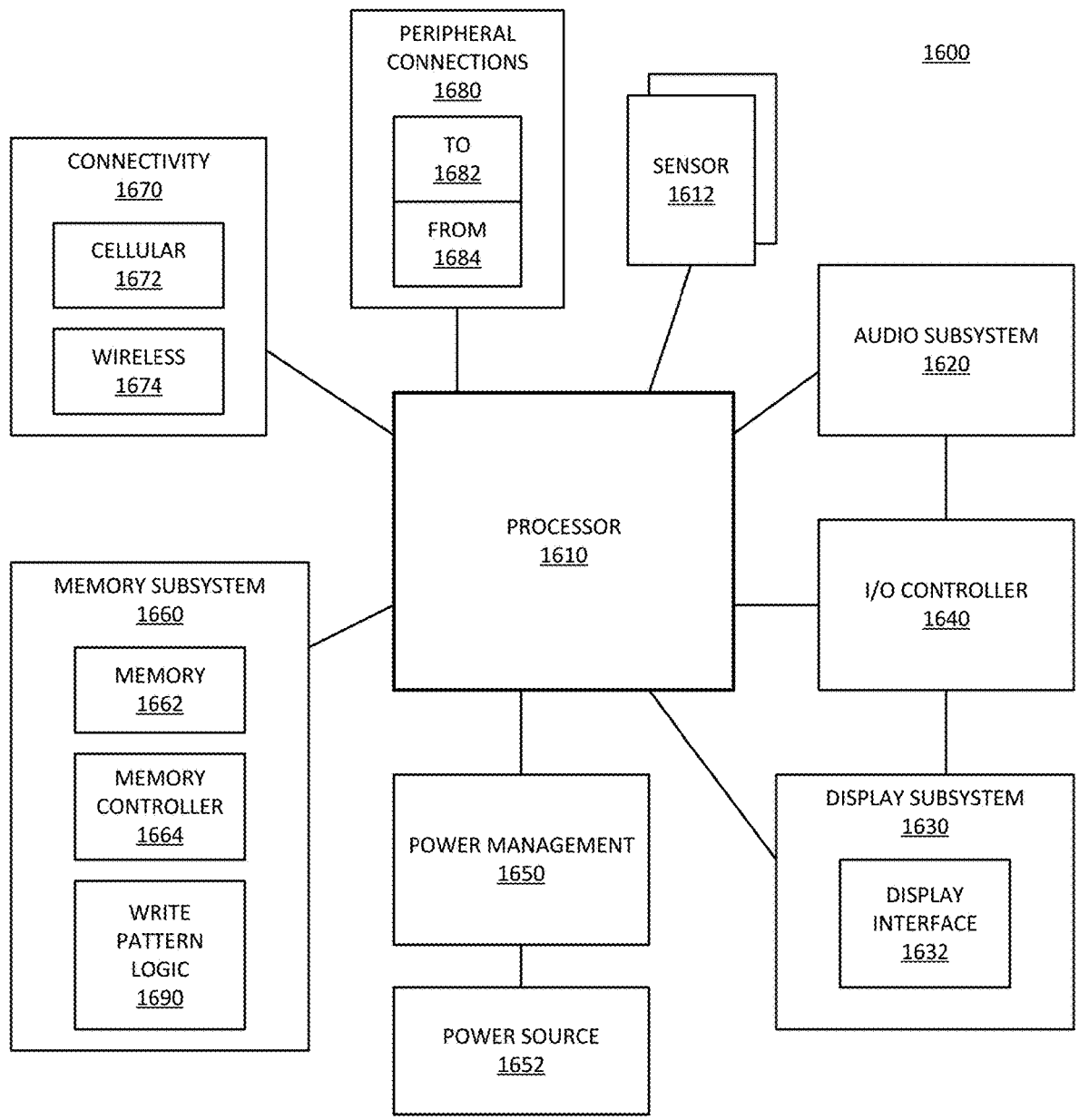
FIG. 16 is a block diagram of an embodiment of a mobile device in which write data pattern replacement can be implemented.

FIG. 16 is a block diagram of an embodiment of a mobile device in which write data pattern replacement can be implemented. Device 1600 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 1600.

Device 1600 includes processor 1610, which performs the primary processing operations of device 1600. Processor 1610 can include one or more physical devices, such as microprocessors, application processors, microcontrollers, programmable logic devices, or other processing means. The processing operations performed by processor 1610 include the execution of an operating platform or operating system on which applications and device functions are executed. The processing operations include operations related to I/O (input/output) with a human user or with other devices, operations related to power management, operations related to connecting device 1600 to another device, or a combination. The processing operations can also include operations related to audio I/O, display I/O, or other interfacing, or a combination. Processor 1610 can execute data stored in memory. Processor 1610 can write or edit data stored in memory.

In one embodiment, system 1600 includes one or more sensors 1612. Sensors 1612 represent embedded sensors or interfaces to external sensors, or a combination. Sensors 1612 enable system 1600 to monitor or detect one or more conditions of an environment or a device in which system 1600 is implemented. Sensors 1612 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1612 can also include sensors for biometric systems such as fingerprint recognition systems, face detection or recognition systems, or other systems that detect or recognize user features. Sensors 1612 should be understood broadly, and not limiting on the many different types of sensors that could be implemented with system 1600. In one embodiment, one or more sensors 1612 couples to processor 1610 via a frontend circuit integrated with processor 1610. In one embodiment, one or more sensors 1612 couples to processor 1610 via another component of system 1600.

In one embodiment, device 1600 includes audio subsystem 1620, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 1600, or connected to device 1600. In one embodiment, a user interacts with device 1600 by providing audio commands that are received and processed by processor 1610.

Display subsystem 1630 represents hardware (e.g., display devices) and software components (e.g., drivers) that provide a visual display for presentation to a user. In one embodiment, the display includes tactile components or touchscreen elements for a user to interact with the computing device. Display subsystem 1630 includes display interface 1632, which includes the particular screen or hardware device used to provide a display to a user. In one embodiment, display interface 1632 includes logic separate from processor 1610 (such as a graphics processor) to perform at least some processing related to the display. In one embodiment, display subsystem 1630 includes a touchscreen device that provides both output and input to a user.

In one embodiment, display subsystem 1630 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, display subsystem includes a touchscreen display. In one embodiment, display subsystem 1630 generates display information based on data stored in memory or based on operations executed by processor 1610 or both.

I/O controller 1640 represents hardware devices and software components related to interaction with a user. I/O controller 1640 can operate to manage hardware that is part of audio subsystem 1620, or display subsystem 1630, or both. Additionally, I/O controller 1640 illustrates a connection point for additional devices that connect to device 1600 through which a user might interact with the system. For example, devices that can be attached to device 1600 might include microphone devices, speaker or stereo systems, video systems or other display device, keyboard or keypad devices, or other I/O devices for use with specific applications such as card readers or other devices.

As mentioned above, I/O controller 1640 can interact with audio subsystem 1620 or display subsystem 1630 or both. For example, input through a microphone or other audio device can provide input or commands for one or more applications or functions of device 1600. Additionally, audio output can be provided instead of or in addition to display output. In another example, if display subsystem includes a touchscreen, the display device also acts as an input device, which can be at least partially managed by I/O controller 1640. There can also be additional buttons or switches on device 1600 to provide I/O functions managed by I/O controller 1640.

In one embodiment, I/O controller 1640 manages devices such as accelerometers, cameras, light sensors or other environmental sensors, gyroscopes, global positioning system (GPS), or other hardware that can be included in device 1600, or sensors 1612. The input can be part of direct user interaction, as well as providing environmental input to the system to influence its operations (such as filtering for noise, adjusting displays for brightness detection, applying a flash for a camera, or other features).

In one embodiment, device 1600 includes power management 1650 that manages battery power usage, charging of the battery, and features related to power saving operation. Power management 1650 manages power from power source 1652, which provides power to the components of system 1600. In one embodiment, power source 1652 includes an AC to DC (alternating current to direct current) adapter to plug into a wall outlet. Such AC power can be renewable energy (e.g., solar power, motion based power). In one embodiment, power source 1652 includes only DC power, which can be provided by a DC power source, such as an external AC to DC converter. In one embodiment, power source 1652 includes wireless charging hardware to charge via proximity to a charging field. In one embodiment, power source 1652 can include an internal battery or fuel cell source.

Memory subsystem 1660 includes memory device(s) 1662 for storing information in device 1600. Memory subsystem 1660 can include nonvolatile (state does not change if power to the memory device is interrupted) or volatile (state is indeterminate if power to the memory device is interrupted) memory devices, or a combination. Memory 1660 can store application data, user data, music, photos, documents, or other data, as well as system data (whether long-term or temporary) related to the execution of the applications and functions of system 1600. In one embodiment, memory subsystem 1660 includes memory controller 1664 (which could also be considered part of the control of system 1600, and could potentially be considered part of processor 1610). Memory controller 1664 includes a scheduler to generate and issue commands to control access to memory device 1662.

Connectivity 1670 includes hardware devices (e.g., wireless or wired connectors and communication hardware, or a combination of wired and wireless hardware) and software components (e.g., drivers, protocol stacks) to enable device 1600 to communicate with external devices. The external device could be separate devices, such as other computing devices, wireless access points or base stations, as well as peripherals such as headsets, printers, or other devices. In one embodiment, system 1600 exchanges data with an external device for storage in memory or for display on a display device. The exchanged data can include data to be stored in memory, or data already stored in memory, to read, write, or edit data.

Connectivity 1670 can include multiple different types of connectivity. To generalize, device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1674 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1680 include hardware interfaces and connectors, as well as software components (e.g., drivers, protocol stacks) to make peripheral connections. It will be understood that device 1600 could both be a peripheral device ("to" 1682) to other computing devices, as well as have peripheral devices ("from" 1684) connected to it. Device 1600 commonly has a "docking" connector to connect to other computing devices for purposes such as managing (e.g., downloading, uploading, changing, synchronizing) content on device 1600. Additionally, a docking connector can allow device 1600 to connect to certain peripherals that allow device 1600 to control content output, for example, to audiovisual or other systems.

In addition to a proprietary docking connector or other proprietary connection hardware, device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, memory subsystem 1660 includes write pattern logic 1690, which represents logic at the memory device to internally replace write data with a predefined data pattern, or to replace write data to change a pattern of the input data. In one embodiment, memory device 1662 receives a write command from memory controller 1664, which can include a write command that indicates a data pattern without sending the data over one or more signal lines. Write pattern logic 1690 enables memory subsystem 1660 to cause memory 1662 to write a data pattern other than what appears the data bus. In one embodiment, with a write pattern command, memory controller 1664 sends a command, and logic internal to memory 1662 decodes the command and writes a pattern of data to the data array. In one embodiment, memory 1662 decodes the command to identify the write pattern in accordance with a mode register setting or other configuration. Write pattern logic 1690 can be in accordance with any embodiment described herein. Write pattern logic 1690 can be flexible enough to provide data for an entire burst on a data signal line, or for an entire burst for multiple data signal lines. Write pattern logic 1690 can be flexible enough to replace a single bit in multiple signal lines. In one embodiment, write pattern logic 1690 includes latches or comparable logic that can set and reset specific bits for serialization of data to the memory array for writing. In one embodiment, write pattern logic 1690 represents both logic within memory 1662 to decode and write replacement data in response to a command, as well as logic within memory controller 1664 to generate a decoded write command to avoid sending data over a data bus to memory 1662.

In one aspect, a memory controller includes: command logic to generate a write pattern command to trigger an associated dynamic random access memory (DRAM) device to write data to a memory array of the DRAM device without having to send the data to the DRAM device; and I/O (input/output) circuitry including an interface to a command bus and to a data bus to the DRAM device, wherein the I/O circuitry is to drive the write pattern command to trigger the DRAM device to internally generate write pattern data to write, instead of data bits from the data bus.

In one embodiment, the write pattern equals all zeros. In one embodiment, the DRAM device further comprising: a register to store the write pattern; wherein to trigger the DRAM device to internally generate the write pattern data comprises the DRAM device to internally generate the write pattern comprises the DRAM device to access write pattern data from the register. In one embodiment, the I/O circuitry is to send a mode register write command to the DRAM device to program the write pattern. In one embodiment, the register is to store one byte of write pattern data, wherein for a x4 DRAM device, the DRAM device is to provide half of the register write pattern data byte as the input to write to the memory array. In one embodiment, the register is to store one byte of write pattern data, wherein for a x8 DRAM device, the DRAM device is to provide all the register write pattern data byte as the input to write to the memory array. In one embodiment, the register is to store one byte of write pattern data, wherein for a x16 interface to couple to sixteen data signal lines, the DRAM device is to provide all the register write pattern data byte twice as the input to write to the memory array. In one embodiment, the DRAM device is to include a data alignment register, wherein the data alignment register includes a set capability to trigger a logic high output and a reset capability to trigger a logic low output, and where the DRAM device is to include control logic to selectively set and reset the alignment register to program the write pattern. In one embodiment, the DRAM device is to include a data alignment register output for each data bit of the data bus, and wherein the control logic is to selectively set and reset data bits for an individual data bit as input to write to the data array while allowing input to write to the data array from the data signal line for another data bit. In one embodiment, the DRAM device is to include a data alignment register output for each data bit of the data bus, and wherein the control logic is to selectively set and reset data bits for a data bit for an entire write data burst. In one embodiment, the DRAM device comprises a synchronous DRAM (SDRAM) compatible with a double data rate version 5 (DDR5) standard.

In one aspect, a dynamic random access memory (DRAM) device includes: a memory array including addressable memory locations; command bus interface circuitry to couple to a command bus; and data bus interface circuitry to couple to a data bus; wherein in response to write command encoding on the command bus, the DRAM device is to internally generate a write pattern to provide as input to write to the memory array, instead of data bits from the data bus.

In one embodiment, the write pattern equals all zeros. In one embodiment, further comprising: a register to store the write pattern; wherein the DRAM device to internally generate the write pattern comprises the DRAM device to access write pattern data from the register. In one embodiment, the register comprises a mode register, and the write pattern is programmable through a mode register write command. In one embodiment, the register is to store one byte of write pattern data, wherein the data bus interface comprises a x4 interface to couple to four data signal lines, and wherein in response to the write command encoding, the DRAM device is to provide half of the register write pattern data byte as the input to write to the memory array. In one embodiment, the register is to store one byte of write pattern data, wherein the data bus interface comprises a x8 interface to couple to eight data signal lines, and wherein in response to the write command encoding, the DRAM device is to provide all the register write pattern data byte as the input to write to the memory array. In one embodiment, the register is to store one byte of write pattern data, wherein the data bus interface comprises a x16 interface to couple to sixteen data signal lines, and wherein in response to the write command encoding, the DRAM device is to provide all the register write pattern data byte twice as the input to write to the memory array. In one embodiment, the data bus interface circuitry includes a data alignment register, wherein the data alignment register includes a set capability to trigger a logic high output and a reset capability to trigger a logic low output, wherein the data bus interface circuitry includes control logic to selectively set and reset the alignment register to program the write pattern. In one embodiment, the data bus interface circuitry includes a data alignment register output for each data bit of the data bus, and wherein the control logic is to selectively set and reset data bits for an individual data bit as input to write to the data array while allowing input to write to the data array from the data signal line for another data bit. In one embodiment, the data bus interface circuitry includes a data alignment register output for each data bit of the data bus, and wherein the control logic is to selectively set and reset data bits for a data bit for an entire write data burst. In one embodiment, the DRAM device comprises a synchronous DRAM (SDRAM) compatible with a double data rate version 5 (DDR5) standard.

In one aspect, a system with a memory subsystem includes: a memory controller; and multiple dynamic random access memory (DRAM) devices in accordance with any embodiment of a DRAM device of the preceding two paragraphs. In one embodiment, further comprising one or more of: at least one processor communicatively coupled to the memory controller; a display communicatively coupled to at least one processor; a network interface communicatively coupled to at least one processor; or a battery to power the system.

In one aspect, a system with a memory subsystem includes: multiple dynamic random access memory (DRAM) devices; and a memory controller coupled to the multiple DRAM devices, the memory controller in accordance with any embodiment of a memory controller of the preceding two paragraphs. In one embodiment, further comprising one or more of: at least one processor communicatively coupled to the memory controller; a display communicatively coupled to at least one processor; a network interface communicatively coupled to at least one processor; or a battery to power the system.

In one aspect, a dynamic random access memory (DRAM) device includes: a memory array including addressable memory locations; a register to store a write pattern; command bus interface circuitry to couple to a command bus; and data bus interface circuitry to couple to a data bus; wherein in response to write command encoding on the command bus, the DRAM device is to provide the write pattern from the register as input to write to the memory array, instead of data bits from the data bus.

In one aspect, a system with a memory subsystem includes: a memory controller; and multiple dynamic random access memory (DRAM) devices, wherein a DRAM device includes a memory array including addressable memory locations; a register to store a write pattern; command bus interface circuitry to couple to a command bus; and data bus interface circuitry to couple to a data bus; wherein in response to write command encoding on the command bus, the DRAM device is to provide the write pattern from the register as input to write to the memory array, instead of data bits from the data bus. In one embodiment, the system further comprising one or more of: at least one processor communicatively coupled to the memory controller; a display communicatively coupled to at least one processor; a network interface communicatively coupled to at least one processor; or a battery to power the system.

In one aspect, a memory controller includes: command logic to generate a write pattern command to trigger an associated dynamic random access memory (DRAM) device to write data to a memory array of the DRAM device without having to send the data to the DRAM device; and I/O (input/output) circuitry including an interface to a command bus and to a data bus to the DRAM device, wherein the I/O circuitry is to drive the write pattern command to trigger the DRAM to write a pattern from a register of the DRAM device, instead of data bits from the data bus.

In one embodiment, the I/O circuitry is to send a mode register write command to the DRAM device to program the write pattern. In one embodiment, the register is to store one byte of write pattern data, wherein for a x4 DRAM device, the DRAM device is to provide half of the register write pattern data byte as the input to write to the memory array; for a x8 DRAM device, the DRAM device is to provide all the register write pattern data byte as the input to write to the memory array; and, for a x16 interface to couple to sixteen data signal lines, the DRAM device is to provide all the register write pattern data byte twice as the input to write to the memory array. In one embodiment, the DRAM device is to include a data alignment register, wherein the data alignment register includes a set capability to trigger a logic high output and a reset capability to trigger a logic low output, and where the DRAM device is to include control logic to selectively set and reset the alignment register to program the write pattern.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device, comprising:
a mode register to store a write pattern, programmable via a mode register write (MRW) command;
command bus interface circuitry to couple to a command/address (CA) bus; and
data bus interface circuitry to couple to a data (DQ) bus and a data strobe (DQS) signal;
wherein in response to a write pattern command on the CA bus, the memory device is to access the write pattern from the mode register as write data instead of data bits from the DQ bus, wherein the DQ bus and the DQS signal are not used for the write pattern command.

2. The memory device of claim 1, wherein the write pattern is defaulted to all zeros, changeable via the MRW command.

3. The memory device of claim 2, wherein the write pattern comprises a repetition of "1" or "10".

4. The memory device of claim 2, wherein the write pattern is changeable bit-by-bit in the mode register.

5. The memory device of claim 2, wherein the write pattern is to be repeated for multiple bytes of a write burst sequence.

6. The memory device of claim 1, wherein in response to the write pattern command, the memory device is to not turn on internal on-die termination (ODT).

7. The memory device of claim 1, wherein for the write pattern command, the memory device is to maintain write timing between consecutive commands as measured from a clock cycle where write data would have been transferred for a standard write command.

8. The memory device of claim 1, wherein the memory device is to measure write timing (tWR) for the write pattern command from a last triggering edge of a write burst to a triggering edge of a precharge command.

9. The memory device of claim 1, wherein the mode register is to store one byte of data as one byte of write pattern, wherein the data bus interface circuitry comprises one of:
a x4 interface to couple to four data signal lines, and wherein in response to the write pattern command, the memory device is to provide half of the one byte of write pattern as the write data to write to a memory array of the memory device;
a x8 interface to couple to eight data signal lines, and wherein in response to the write pattern command, the memory device is to provide all of the one byte of write pattern as the write data to write to the memory array; or
a x16 interface to couple to sixteen data signal lines, and wherein in response to the write pattern command, the memory device is to provide all of the one byte of write pattern twice as the write data to write to the memory array.

10. The memory device of claim 1, wherein the memory device comprises a synchronous dynamic random access memory (SDRAM) device compatible with a double data rate (DDR) standard.

11. The memory device of claim 1, wherein the memory device comprises a not AND (NAND) memory device.

12. The memory device of claim 1, wherein the memory device comprises a three dimensional crosspoint phase change memory device.

13. A system to write data to a memory, comprising:
a controller to control access to a memory device; and
a memory device coupled to the controller, the memory device including
a mode register to store a write pattern, programmable via a mode register write (MRW) command;
command bus interface circuitry to couple to a command/address (CA) bus; and
data bus interface circuitry to couple to a data (DQ) bus and a data strobe (DQS) signal;
wherein in response to a write pattern command on the CA bus, the memory device is to access the write pattern from the mode register as write data instead of data bits from the DQ bus, wherein the DQ bus and the DQS signal are not used for the write pattern command.

14. The system of claim 13, wherein the write pattern is defaulted to all zeros, changeable via the MRW command.

15. The system of claim 14, wherein the write pattern is changeable bit-by-bit in the mode register.

16. The system of claim 14, wherein the write pattern is to be repeated for multiple bytes of a write burst sequence.

17. The system of claim 13, wherein for the write pattern command, the memory device is to maintain write timing between consecutive commands as measured from a clock cycle where write data would have been transferred for a standard write command, wherein the memory device is to measure write timing (tWR) for the write pattern command from a last triggering edge of a write burst to a triggering edge of a precharge command.

18. The system of claim 13, wherein the mode register is to store one byte of data as one byte of write pattern,
wherein the data bus interface circuitry comprises a x4 interface to couple to four data signal lines, and wherein in response to the write pattern command, the memory device is to provide half of the one byte of write pattern as the write data to write to a memory array of the memory device, or
wherein the data bus interface circuitry comprises a x8 interface to couple to eight data signal lines, and wherein in response to the write pattern command, the memory device is to provide all of the one byte of write pattern as the write data to write to the memory array, or
wherein the data bus interface circuitry comprises a x16 interface to couple to sixteen data signal lines, and wherein in response to the write pattern command, the memory device is to provide all of the one byte of write pattern twice as the write data to write to the memory array.

19. The system of claim 13, wherein the memory device comprises a not AND (NAND) memory device.

20. The system of claim 13, wherein the memory device comprises a three dimensional crosspoint phase change memory device.

21. The system of claim 13, further comprising one or more of:
at least one processor communicatively coupled to the controller;
a display communicatively coupled to at least one processor;
a network interface communicatively coupled to at least one processor; or
a battery to power the system.

22. A memory controller, comprising:
data bus interface circuitry to couple to a data (DQ) bus and a data strobe (DQS) signal; and
command bus interface circuitry to couple to a command/address (CA) bus, to send a write pattern command to a memory device on the CA bus, the write pattern command to trigger the memory device to access a write pattern from a mode register of the memory device as write data instead of data bits from the DQ bus;
wherein the mode register is programmable via a mode register write (MRW) command, wherein the DQ bus and the DQS signal are not used for the write pattern command.

23. The memory controller of claim 22, wherein the write pattern is changeable bit-by-bit in the mode register.

24. The memory controller of claim 22, wherein the write pattern is to be repeated for multiple bytes of a write burst sequence.

25. The memory controller of claim 22, wherein in response to the write pattern command, the memory device is to not turn on internal on-die termination (ODT).

26. The memory controller of claim 22, wherein for the write pattern command, the memory controller is to maintain write timing between consecutive commands as measured from a clock cycle where write data would have been transferred for a standard write command, wherein the memory controller is to measure write timing (tWR) for the write pattern command from a last triggering edge of a write burst to a triggering edge of a precharge command.

27. The memory controller of claim 22, wherein the mode register of the memory device is to store one byte of data as one byte of write pattern, wherein for a x4 memory device, in response to the write pattern command, the mode register is to provide half of the one byte of write pattern as the write data, or
wherein for a x8 memory device, in response to the write pattern command, the mode register is to provide all of the one byte of write pattern as the write data, or
wherein for a x16 memory device, in response to the write pattern command, the mode register is to provide all of the one byte of write pattern twice as the write data.

* * * * *